US012789332B2

United States Patent
(12) United States Patent
Monetti et al.

(10) Patent No.: US 12,789,332 B2
(45) Date of Patent: Nov. 10, 2026

(54) ADAPTER FOR MOUNTING AN L-SHAPED ALLEN WRENCH KEY IN A CHUCK OF A ROTARY TOOL AND METHOD OF USE OF THE SAME

(71) Applicant: Jethro Monetti, Phoenixville, PA (US)

(72) Inventors: Jethro Monetti, Phoenixville, PA (US); David E. Yaeger, Telford, PA (US)

(73) Assignee: Jethro Monetti, Phoenixville, PA (US)

( * ) Notice: Subject to any disclaimer, the term of this patent is extended or adjusted under 35 U.S.C. 154(b) by 349 days.

(21) Appl. No.: 18/223,707

(22) Filed: Jul. 19, 2023

(65) Prior Publication Data

US 2024/0042583 A1 Feb. 8, 2024

Related U.S. Application Data

(60) Provisional application No. 63/395,518, filed on Aug. 5, 2022.

(51) Int. Cl.
*B25B 23/00* (2006.01)
*B25B 21/00* (2006.01)

(52) U.S. Cl.
CPC ........ *B25B 23/0035* (2013.01); *B25B 21/007* (2013.01)

(58) Field of Classification Search
CPC . B25B 23/0035; B25B 21/007; B25B 15/008; B23B 31/202; B25G 3/22; B25G 1/005
See application file for complete search history.

(56) References Cited

U.S. PATENT DOCUMENTS 2,713,281 A * 7/1955 Poteet ..................... B25B 13/54 81/177.2
2,719,042 A * 9/1955 James .................... B25G 1/005 81/436
2,726,091 A * 12/1955 Topar .................. B25B 23/0035 81/436
2,842,020 A * 7/1958 Tarquinio .............. B25B 15/008 81/177.2
3,595,592 A * 7/1971 Wagner .................... B25G 1/00 279/47
3,598,002 A * 8/1971 Garvey .................. B25G 1/085 81/438
3,766,811 A * 10/1973 Callahan ................. B25B 23/16 81/177.2
3,850,056 A * 11/1974 Allen ..................... B25G 1/066 81/439
5,938,212 A * 8/1999 Wadsworth ........... B23B 31/202 279/42

(Continued)

*Primary Examiner* — David B. Thomas
(74) *Attorney, Agent, or Firm* — Caesar Rivise, PC

(57) ABSTRACT

An adapter and method of use for releasably mounting an L-shaped Allen wrench key in a chuck of a rotary tool. The adapter includes a mount for releasably mounting the adapter on the chuck of the rotary tool. The adapter includes a base from which a center shaft projects upward. The center shaft is axially aligned with the longitudinal axis of the mount and has a recess for releasably receiving a long leg of the L-shaped Allen wrench key so that the central longitudinal axis of the long leg is coincident with the rotation axis of the chuck, and with short leg of the L-shaped Allen wrench key being located within a radially extending channel in the base of the adapter.

20 Claims, 10 Drawing Sheets

(56) References Cited

U.S. PATENT DOCUMENTS

| | | | | |
|---|---|---|---|---|
| 6,382,057 | B1 * | 5/2002 | Kienholz | B25B 23/00 81/436 |
| 6,968,758 | B2 * | 11/2005 | Lin | B25B 13/462 81/176.1 |
| 8,033,200 | B2 * | 10/2011 | Johnson | B25B 13/461 81/177.2 |
| 10,035,197 | B2 * | 7/2018 | Boske | B23B 51/0426 |
| 11,511,402 | B2 * | 11/2022 | Sergyeyenko | B25B 23/0035 |

* cited by examiner

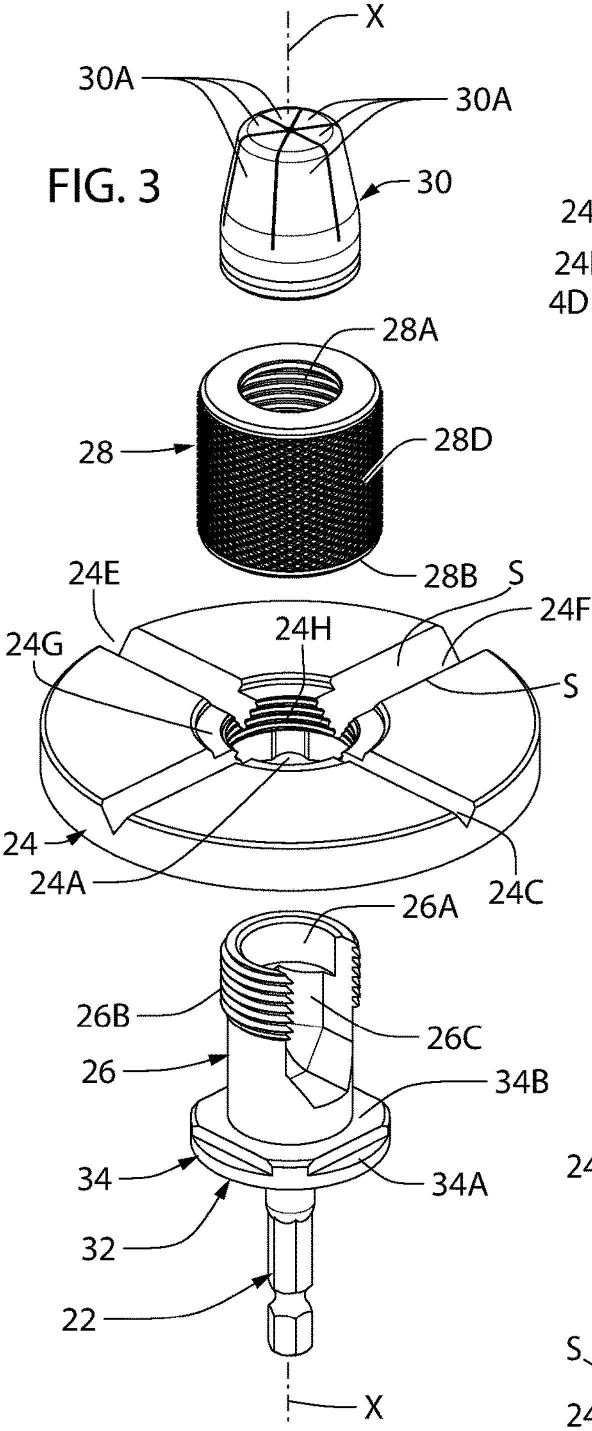
FIG. 3
FIG. 4A
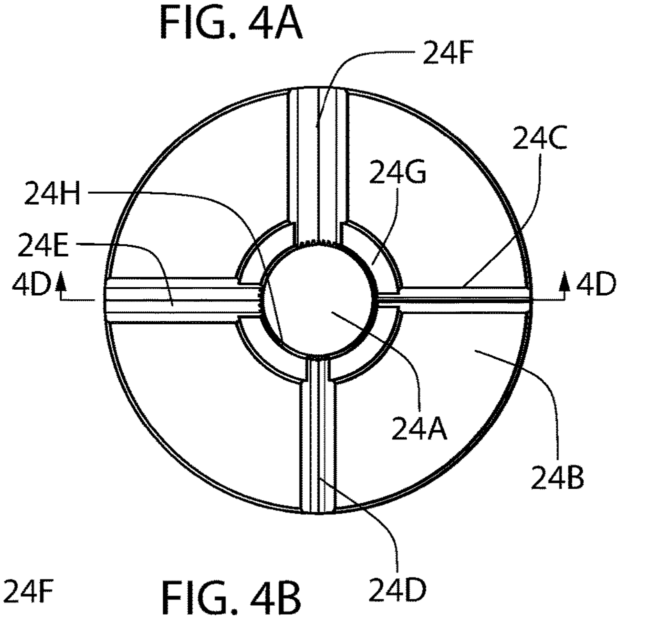
FIG. 4B
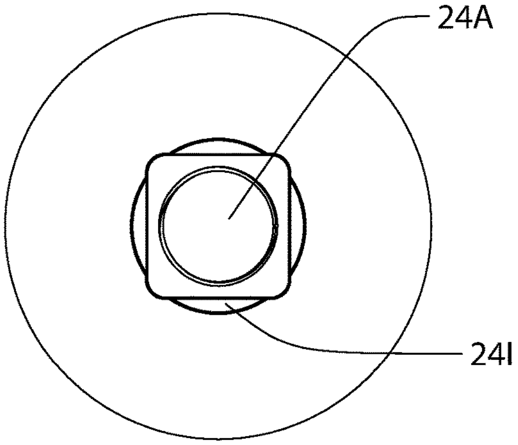
FIG. 4C
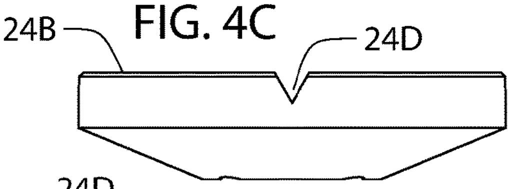
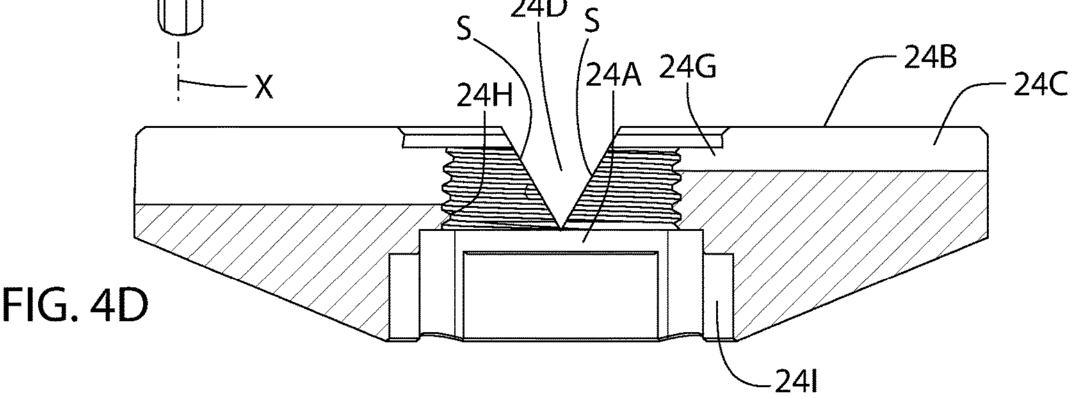
FIG. 4D

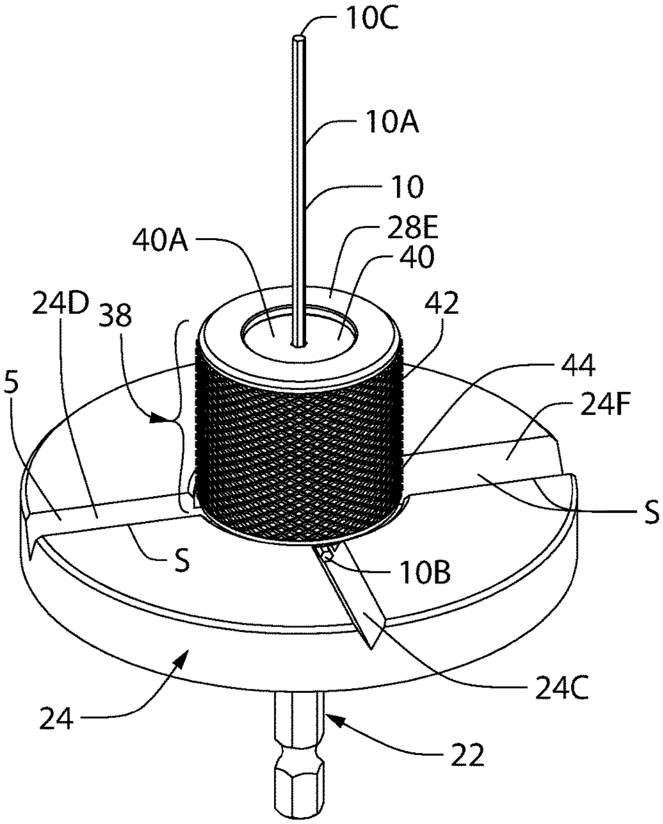
FIG. 12
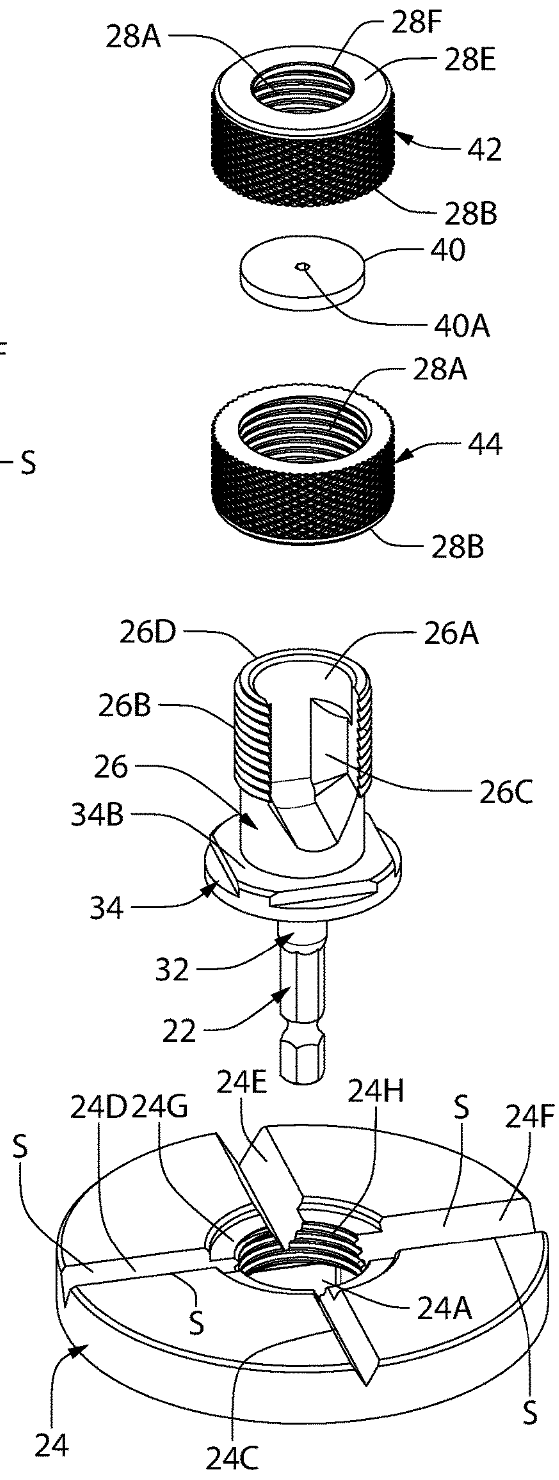
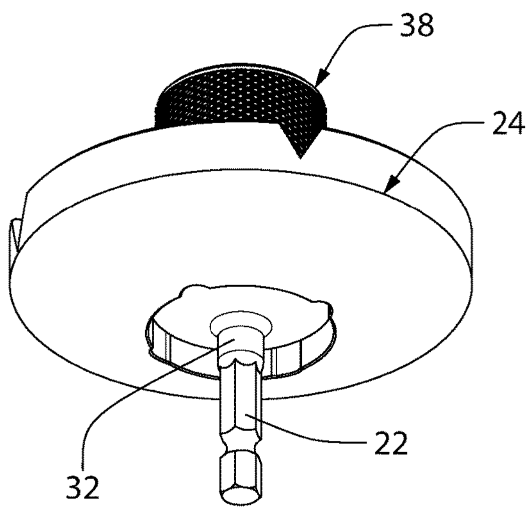
FIG. 13
FIG. 14

FIG. 15
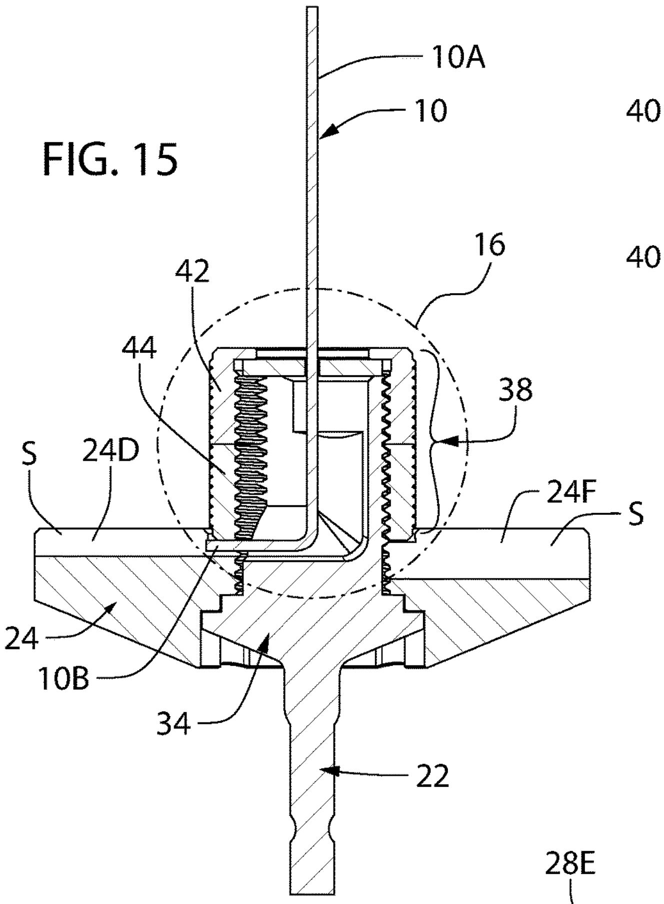
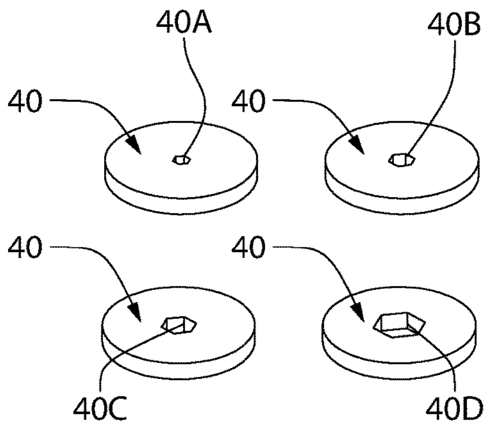
FIG. 17
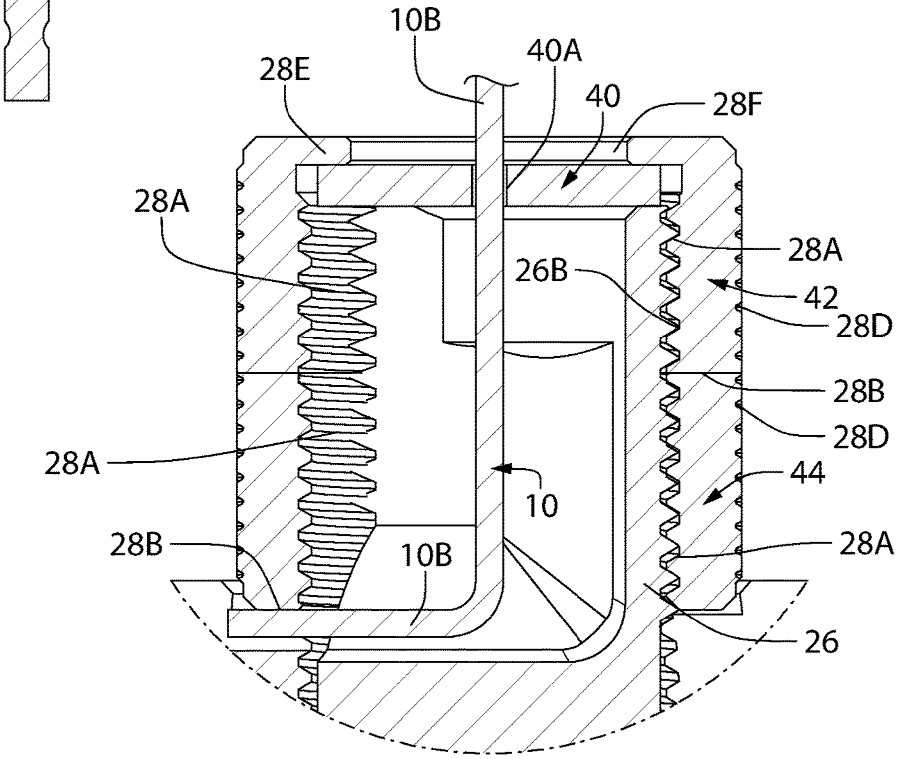
FIG. 16

ADAPTER FOR MOUNTING AN L-SHAPED ALLEN WRENCH KEY IN A CHUCK OF A ROTARY TOOL AND METHOD OF USE OF THE SAME

CROSS-REFERENCE TO RELATED APPLICATIONS

This utility application claims the benefit under 35 U.S.C. § 119(e) of Provisional Application Ser. No. 63/395,518, filed on Aug. 5, 2022, entitled Adapter For Mounting An L-Shaped Allen Wrench Key In A Chuck Of A Rotary Tool And Method Of Use Of The Same, the entire disclosure of that provisional application is incorporated by reference herein for all purposes.

FIELD OF THE INVENTION

This invention relates generally to tools and more particularly to an adapter for use in a chuck of a rotary tool, e.g., electric drill, to receive and hold a L-shaped Allen wrench key so that the long leg of the L-shaped Allen wrench key can be rotated about the rotation axis of the chuck.

BACKGROUND OF THE INVENTION

As is well known an Allen key or Allen wrench (also known as "Hex key") is a small handheld tool used for turning fasteners, such as bolts and screws which have hexagonally shaped sockets. One common type of Allen key is an L-shaped member having a long leg and a short leg which extends perpendicularly to the long leg. Allen keys work like most other screwdrivers and wrenches in that one can use them by placing the hex shaped end of one of the legs, e.g., the short leg, inside the hexagonal socket head of the fastener and grasping the other leg, e.g., the long leg, and turning the leg that is grasped about the longitudinal axis of the leg whose end is within the hexagonal socket. Turning the leg of the Allen key which is grasped by the user clockwise will tighten the fastener, whereas turning it counterclockwise will loosen or remove the fastener.

Many products, such as furniture, are sold today for assembly by the purchaser and which make use of numerous hexagonal socket fasteners. And many of such products are sold with one or more L-shaped Allen wrenches for use with the hexagonal socket fasteners. Since those L-shaped Allen wrenches are designed to be used manually by being hand-held, their use to assemble furniture or other products making use of numerous fasteners with hexagonal sockets can be quite a time consuming and labor-intensive activity.

Conventional electric or battery-operated drills are commonly used by persons for assembling products using elongated screwdriver bits for mounting in the chuck of the drill. Those bits are linear members whose tip can take various forms depending upon the head of the screw to be driven e.g., slotted-head screws, Philips-head screws, hexagonal-head screws, one-way head screws, square-head screws, and Torx screws. Once the bit is mounted in the chuck of the drill, the bit can be used to drive the screw very quickly. This procedure can be repeated for each fastener to be driven, thereby saving the user considerable time and effort as compared to manually driving the screw with a hand-held manual screwdriver. Unfortunately, a portable power drill cannot be used with an L-shaped Allen wrench to drive fasteners whose heads are in the form of hexagonal sockets, since the working end of the L-shaped Allen wrench, i.e., the leg whose end is inserted in the hexagonal socket extends perpendicularly to the leg which is rotated. Accordingly, a need exists for an adapter arranged for holding an L-shaped Allen wrench to mount it within the chuck of a conventional portable power drill so that the drill can be used to drive a hexagonal socket head screw. The subject invention addresses that need.

BRIEF SUMMARY OF THE INVENTION

One aspect of this invention is an adapter for releasably mounting an L-shaped Allen wrench key in a chuck of a rotary tool. The chuck is rotatable about a rotary axis. The L-shaped Allen wrench key comprises a linear long leg having a first central longitudinal axis and a linear short leg having a second central longitudinal axis extending perpendicular to the first central longitudinal axis. The adapter comprises a mount having a central longitudinal axis. The mount is configured for releasable coupling to the chuck of the rotary tool, whereupon the central longitudinal axis of the mount is coincident with the rotary axis. The adapter includes a center structure coupled to the mount and configured for releasably mounting the L-shaped Allen wrench key on the adapter, wherein the first longitudinal axis of the linear long leg of the L-shaped Allen wrench key is coincident with the rotary axis.

In accordance with one preferred aspect of the adapter of this invention, the center structure comprises an elongated center shaft including a threaded outer surface and a longitudinal channel in the threaded outer surface. The longitudinal channel has a central longitudinal axis coincident with the central longitudinal axis of the mount and configured for receipt of the linear long leg of the L-shaped Allen wrench key, The adapter additionally comprises a base and a threaded member. An elongated center shaft projects upward from the base. The base has at least one channel extending radially from the central longitudinal axis of the mount and configured for receipt of the linear short leg of the L-shaped Allen wrench key therein. Each of the at least one channel includes a pair of opposed surfaces which are configured to engage corresponding surfaces forming portions of the periphery of the linear short leg of the L-shaped Allen wrench key. The threaded member is configured to be threadedly secured on the threaded outer surface of the elongated center shaft to releasably engage a portion of the linear short leg of the Allen wrench key to hold the linear short leg of the L-shaped Allen wrench key in the at least one channel and with the first central longitudinal axis of the linear long leg of the L-shaped Allen wrench key axially aligned with the rotary axis.

In accordance with another preferred aspect of the adapter of this invention, the at least one channel is generally V-shaped.

In accordance with another preferred aspect of the adapter of this invention, the adapter additionally comprises a collet coupled to the threaded member. The collet comprises a plurality of movable jaws encircling the central longitudinal axis of the elongated center shaft. The plurality of jaws is configured to move to engage respective portions of a periphery of the linear long leg of the L-shaped Allen wrench to hold the first central longitudinal axis of the linear long leg of the L-shaped Allen wrench key coincident with the rotary axis.

In accordance with another preferred aspect of the adapter of this invention, the collet includes a bottom end and a top end. The bottom end is secured to a top end of the threaded member, wherein each of the jaws of the plurality of movable jaws is resilient, and wherein the collet includes a plurality of tapering inner surfaces located contiguous and below the plurality of movable jaws. Each of the tapering inner surfaces taper inward radially towards the central longitudinal axis of the elongated center shaft from the bottom end of the collet toward the top end of the collet.

In accordance with another preferred aspect of the adapter of this invention, the adapter is configured to releasably mount different size L-shaped Allen wrench keys thereon.

In accordance with another preferred aspect of the adapter of this invention, the adapter is configured to releasably mount different size L-shaped Allen wrench keys thereon and wherein the base comprises plural channels extending radially from the central longitudinal axis of the elongated center shaft. Each of the channels is configured to receive a linear short leg of a different size L-shaped Allen wrench key.

In accordance with another preferred aspect of the adapter of this invention, the threaded member comprises an internally threaded nut having a bottom edge surface configured for releasable engagement with a portion of the linear short leg of the L-shaped Allen wrench key.

In accordance with another preferred aspect of the adapter of this invention, the long leg has a cross-sectional shape, and wherein the adapter additionally comprises an insert configured for mounting on the elongated center shaft. The insert has a central opening having a shape corresponding to a cross-sectional shape of the long leg of the L-shaped Allen wrench key.

In accordance with another preferred aspect of the adapter of this invention, the elongated center shaft has an upper surface, and the insert comprises a disc configured for releasably disposition on the upper surface. The disc includes a central opening having a shape corresponding to a cross-sectional shape of the long leg of the L-shaped Allen wrench key. The threaded member is configured to releasably engage a portion of the disc to hold the disc on the upper surface of the elongated center shaft.

In accordance with another preferred aspect of the adapter of this invention, the threaded member comprises a first threaded member and a second threaded member, each of which is configured to be threadedly secured on the threaded outer surface of the elongated center shaft. The first threaded member is disposed above the second threaded member. The second threaded member is configured to releasably engage a portion of the linear short leg of the Allen wrench key. The first threaded member is configured to releasably engage a portion of the disc to hold the disc on the upper surface of the elongated center shaft and to releasably lock the second threaded member in place in engagement with a portion of the linear short leg of the L-shaped Allen wrench key.

In accordance with another preferred aspect of the adapter of this invention, the adapter is configured to releasably mount different size L-shaped Allen wrench keys thereon. The base comprises plural channels extending radially from the central longitudinal axis of the elongated center shaft. Each of the channels is configured to receive a linear short leg of a different size L-shaped Allen wrench key. The disc comprises one of a plurality of discs. Each of the plurality of discs has a shape corresponding to a cross-sectional shape of the long leg of the different size L-shaped Allen wrench key.

In accordance with another preferred aspect of the adapter of this invention, the adapter includes a flange interposed between the mount and the elongated center shaft, and the base comprises a base plate configured for mounting on the flange.

In accordance with another preferred aspect of the adapter of this invention, the flange includes a planar top surface and a mesa projecting upward from the planar top surface. The base plate includes a socket configured for receipt of the mesa so that the base plate is prevented from rotating with respect to the flange about the central longitudinal axis.

In accordance with another preferred aspect of the adapter of this invention, the mount is an elongated quick connect shaft configured for releasable mounting within the chuck of the rotary tool.

In accordance with another preferred aspect of the adapter of this invention, the mount comprises a socket for receipt of a standard driver configured for releasable mounting within the chuck of the rotary tool.

Another aspect of this invention is method of using an L-shaped Allen wrench key in a rotary power tool having a chuck. The chuck is rotatable about a rotary axis. The L-shaped Allen wrench key comprises a linear long leg having a first central longitudinal axis and a linear short leg having a second central longitudinal axis extending perpendicularly to the first central longitudinal axis. The method comprises providing an adapter comprising a mount having a central longitudinal axis. The mount is releasably coupled to the chuck of the rotary tool, whereupon the central longitudinal axis of the mount is coincident with the rotary axis. The L-shaped Allen wrench key is releasably mounted on the adapter, wherein the first central longitudinal axis of the linear long leg of the L-shaped Allen wrench key is coincident with the rotary axis. The rotary power tool is operated to cause the linear short leg of the L-shaped Allen wrench key to rotate about the first central longitudinal axis.

In accordance with one preferred aspect of the method of this invention, the adapter comprises a base coupled to the mount and has at least one channel extending radially from the central longitudinal axis of the mount. The V-shaped channel receives the linear short leg of the L-shaped Allen wrench key therein.

In accordance with another preferred aspect of the method of this invention, the adapter additionally comprises an elongated center shaft projecting upward from the base. The elongated center shaft includes a threaded outer surface and a longitudinal channel in the threaded outer surface. The longitudinal channel has a central longitudinal axis extending parallel to the central longitudinal axis of the mount. The linear long leg of the L-shaped Allen wrench key is disposed within the central longitudinal channel with the first central longitudinal axis of the linear long leg of the L-shaped Allen wrench key coincident with the rotary axis.

In accordance with another preferred aspect of the adapter of this invention, the adapter additionally comprises a threaded member threadedly secured on the threaded outer surface of the elongated center shaft to releasably engage a portion of the linear short leg of the L-shaped Allen wrench key to hold the linear short leg of the L-shaped Allen wrench key in the at least one V-shaped channel and with the first central longitudinal axis of the linear long leg of the L-shaped Allen Wrench key coincident with the rotary axis.

BRIEF DESCRIPTION OF SEVERAL VIEWS OF THE DRAWINGS

FIG. 3 is an exploded isometric view of the components making up the adapter shown in FIG. 1, one of those components being a base in the form of a base plate, another of those components being an assembly of an elongated mounting shaft, a flange and an elongated externally threaded shaft, another of those components being a threaded retaining member, and another of those components being a collet;

FIG. 4A is a top plan view of the base plate of the adapter of FIG. 1;

FIG. 4B is a bottom plan view of the base plate of FIG. 4A;

FIG. 4C is a side elevation view of the base plate of FIGS. 4A and 4B;

FIG. 4D is an enlarged sectional of the base plate of FIGS. 4A-4C, taken along line 4D-4D of FIG. 4A;

FIG. 7B is a reduced bottom plan view of the collet of FIG. 7A;

FIG. 12 is an isometric view taken from a top oblique angle of another alternative embodiment of an adapter constructed in accordance with this invention for carrying out the method of this invention, with the adapter being shown mounted on a conventional or standard driver;

FIG. 13 is an isometric view taken from a bottom oblique angle of the embodiment of the adapter shown in FIG. 12;

FIG. 14 is an exploded isometric view of the embodiment of the adapter shown in FIGS. 12-13;

FIG. 15 is a vertical sectional view taken along line 15-15 of FIG. 12;

FIG. 16, is an enlarged vertical sectional view of the portion of the adapter shown within the broken line circle designated by the reference number 16 in FIG. 15; and FIG. 17 is an isometric view of a kit of centering disks, each of which is configured for use in the adapter of FIGS. 12-16 to hold a respectively sized L-shaped Allen wrench key therein.

DETAILED DESCRIPTION OF EXEMPLARY PREFERRED EMBODIMENTS OF THE INVENTION

Figure 1:
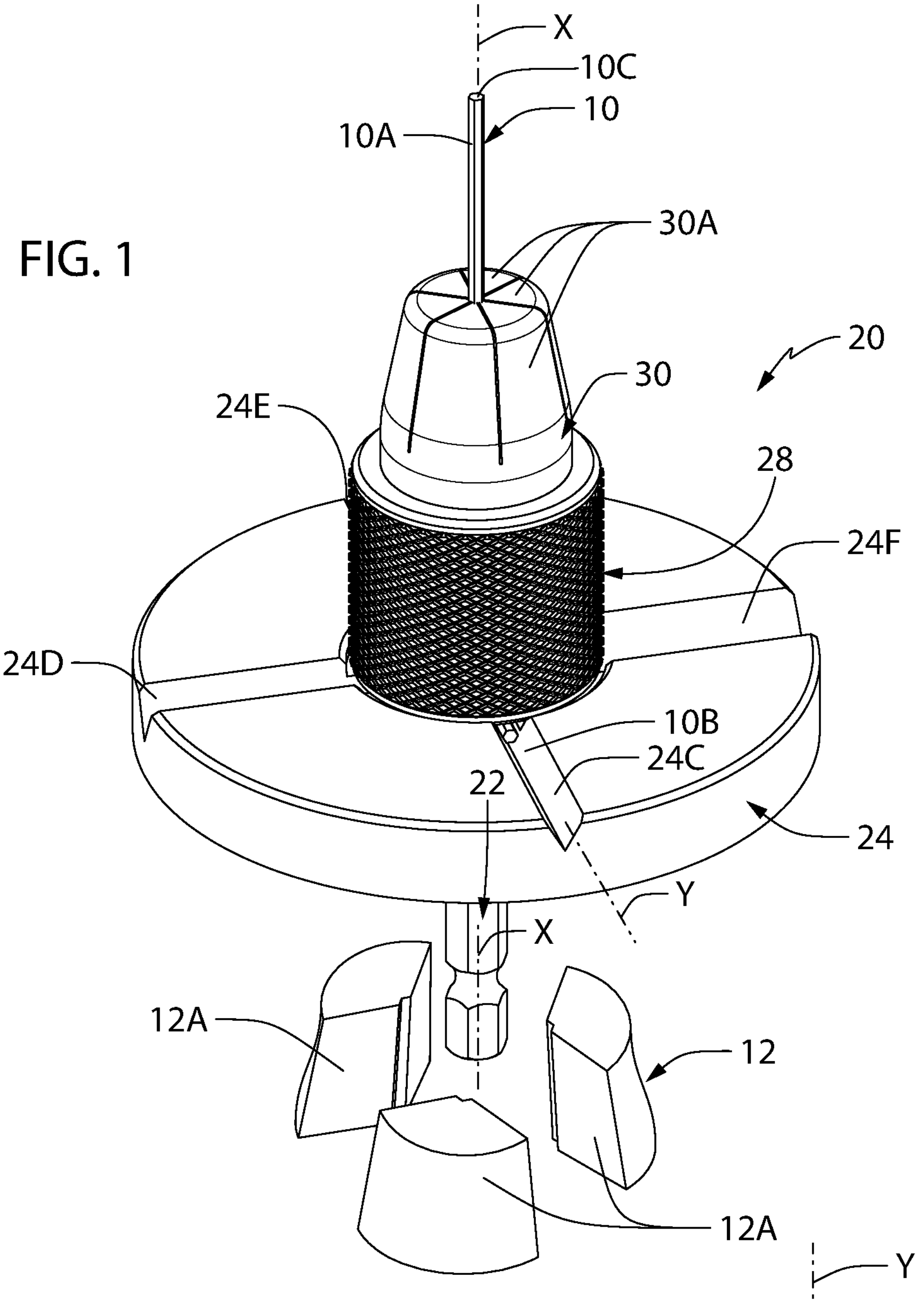
FIG. 1 is an isometric view of one exemplary embodiment of an adapter constructed in accordance with this invention for carrying out the method of this invention.
Figure 2A:
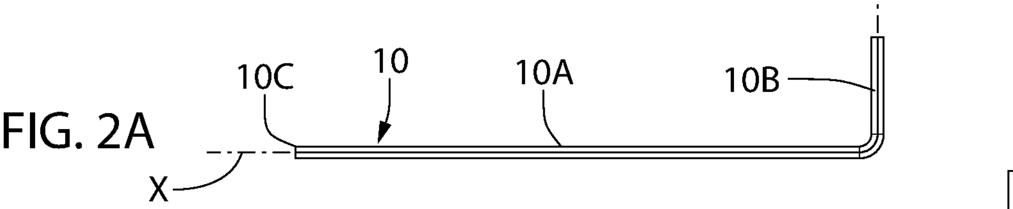
FIG. 2A is a side elevation view of one size conventional L-shaped Allen wrench key which may be used with the adapter of this invention.
Figure 2B:
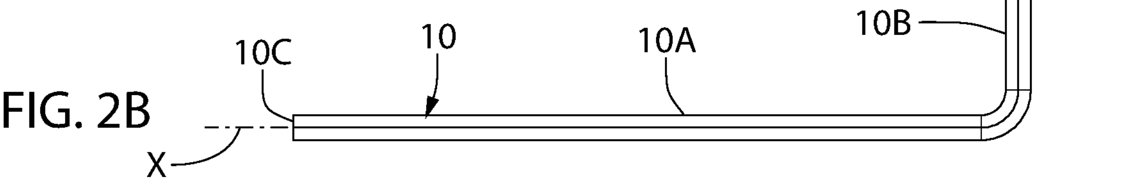
FIG. 2B is a side elevation view of another, larger, size conventional L-shaped Allen wrench key which may be used with the adapter of this invention.

Referring now to the various figures of the drawing wherein like reference characters refer to like parts, there is shown in FIG. 1 one exemplary embodiment of an adapter 20 for rotatably mounting an L-shaped Allen wrench key 10 in a standard Jacobs chuck 12 of a rotary tool or a quick disconnect chuck of a rotary tool, such as an electric or battery-operated drill. The details of the adapter 20 will be described shortly. Suffice it for now to state that the adapter is in the form of a shaft with specific mechanisms that adapt to, and hold firmly in place, variable sizes of standard, and metric, L-shaped Allen wrench keys 10 (also referred to as "L-shaped hex keys"). As is known, and as shown in FIGS. 2A and 2B, such keys basically comprise a long linear leg 10A having a first central longitudinal axis X, and a short linear leg 10B having a second central longitudinal axis Y. The second central longitudinal axis Y is perpendicular to the first central longitudinal axis X. The cross-section of both legs 10A and 10B are identical, i.e., are hexagonal in shape.

The adapter 20 enables a user to place any size L-shaped Hex Key in the adapter, and then use the adapter in the chuck 12 of a rotary tool (not shown), such as an electric or battery-operated driver drill, thus removing the use of the human hand to operate the L-Shaped Hex Key for fastening hex-head screws. As will also be described later, the adapter may be in the form of a kit of components configured to hold L-Shaped Hex Keys of different sizes, metric and American, from 0.0625 inch up to 0.5 inch so that those keys can be used in a standard Jacobs chuck or quick disconnect driver drill.

Figure 9:
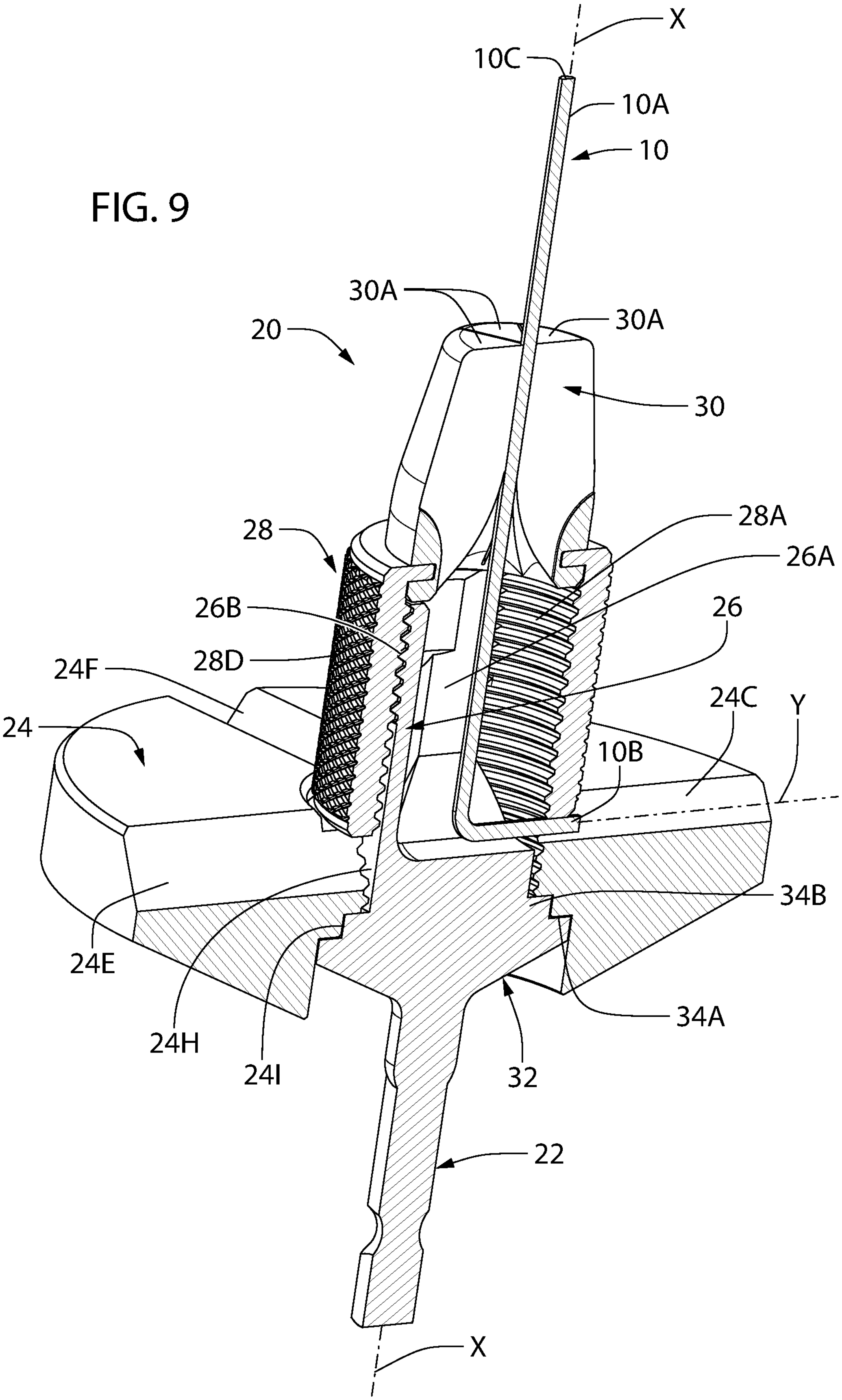
FIG. 9 is a vertical sectional view of the adapter with an L-shaped Allen wrench key mounted therein ready for mounting in the chuck of a rotary tool.

As best seen in FIGS. 1, 3, and 9 the adapter 20 basically comprises mount 22, a base 24, a center shaft 26, a retaining member 28, and a collet 30. The base 24 is preferably in the form of a base plate. The mount 22 and the center shaft 26 are preferably in the form of a unitary member or assembly 32, which also includes a flange 34. The base is preferably in the form of a separate base plate, which is configured to be mounted on the flange 34 when the adapter is assembled for use but can if desired be an integral part of the unitary assembly 32.

The mount 22 of the adapter 20 is in the form of an elongated linear shaft having a central longitudinal axis X. It is preferably of the quick connect type, e.g., having a hexagonal cross-sectional shape, but can be of circular cross-sectional shape if desired. In either case the elongated mounting shaft is configured so that it can be readily inserted and gripped by the jaws 12A (FIG. 1) of a chuck 12 of the rotary tool so that the central longitudinal axis X of the mounting shaft 22 is coincident with the axis of rotation of the chuck 12.

Figure 10:
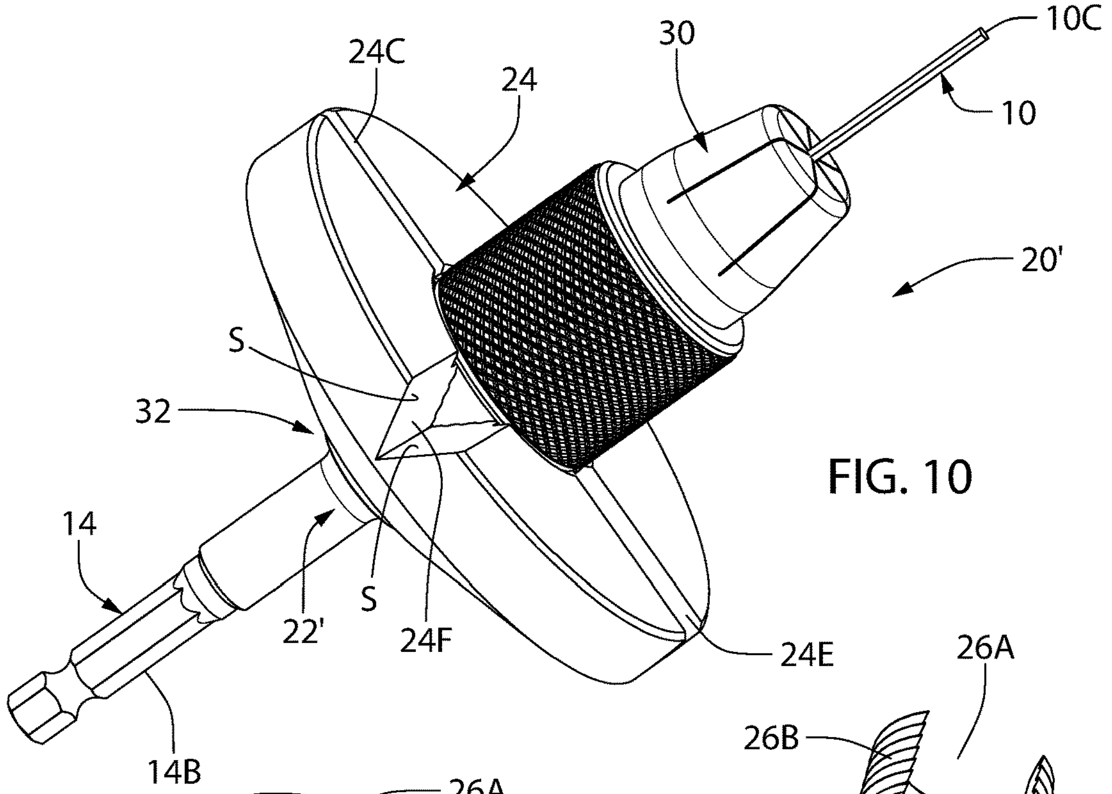
FIG. 10 is an isometric view of an alternative embodiment of an adapter constructed in accordance with this invention for carrying out the method of this invention with the adapter being shown mounted on a conventional or standard driver.
Figure 11A:
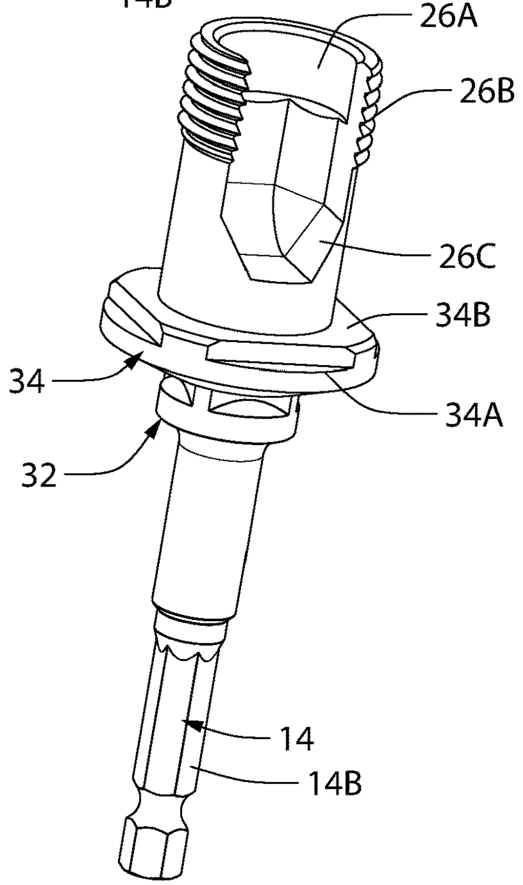
FIG. 11A is an enlarged isometric view of the unitary assembly of the elongated mounting shaft, the flange and the elongated externally threaded shaft of the adapter of FIG. 10 shown mounted on the conventional driver.
Figure 11B:
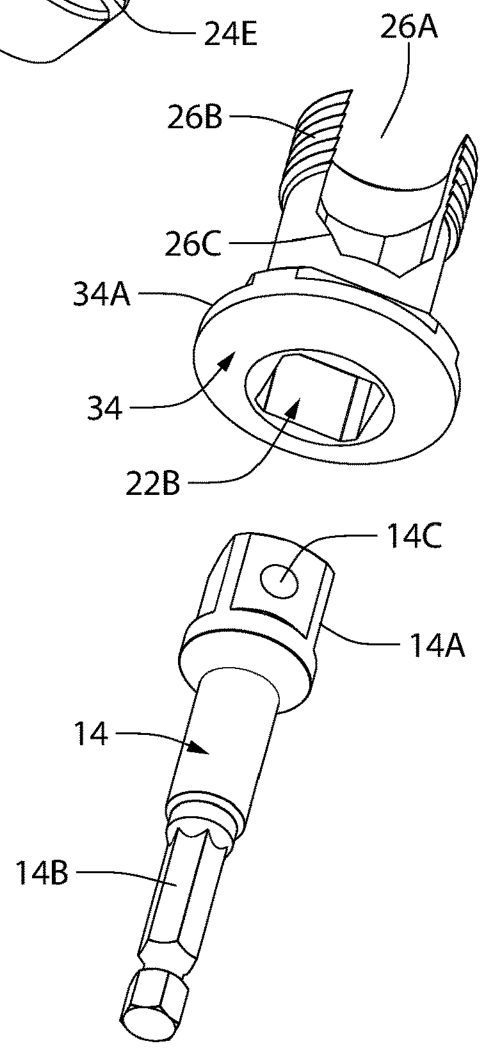
FIG. 11B is an enlarged exploded isometric view showing the mounting of the unitary assembly shown in FIG. 11A on the conventional driver of FIGS. 10 and 11A.

It should be pointed out at this juncture that the mount of the adapter may be in the form of a socket for receipt of a conventional or standard driver, instead of being a quick connect shaft like that of FIGS. 1-9. That alternative mount is shown in FIGS. 10-11B and forms a part of an alternative adapter 20' to be described later.

The flange 34 is located at the upper end of the mounting shaft 22 and is in the form of circular disk-like structure configured to mount the base plate thereon. The details of the flange 34 will be described later.

The center shaft 26 is an elongated linear member of generally circular cross-sectional shape and projects upward from the center of the flange 34. The details of the center shaft 26 will also be described later. Suffice it for now to state that the center shaft includes a longitudinally extending recess 26A in a longitudinally extending portion of the circular periphery of the center shaft. The recess 26A forms a hollow interior space within the center shaft that is arranged to receive the long leg 10A of an L-shaped Hex Key. The hollow interior space includes circular interior space in the top portion of the center shaft and a rectangular interior space in the form of a socket 26C below the circular interior space. The hollow interior space has a central longitudinal axis X which is coincident with the central longitudinal axis X of the mounting shaft 22. The center shaft 26 is threaded with external helical threads 26B extending about the periphery of the center shaft at the upper end of the center shaft and contiguous with the top surface 26D of the center shaft. The external threads are configured to be engaged by internal threads of the retaining member 28.

The base plate is best seen in FIGS. 3 and 4A-4D. It basically comprises a disc-like member having a central opening 24A configured to receive the center shaft 26 so that the base plate can be mounted on the flange 34 to complete the unitary assembly 32. The details of the base plate 24 will also be described later. Suffice it for now to state that the base plate 24 is preferably circular in shape and has a top surface 24B including a plurality, e.g., four, elongated linear channels 24C, 24D, 24E, and 24F which extend radially outward from the central axis X of the base plate. Each channel is configured to receive a short leg of a particular size L-shaped Hex Key 10 with the long leg 10A of the key located within the recess 26A, so that the central longitudinal axis X of the long leg 10A extends parallel to the central longitudinal axis X of the mounting shaft 22. To that end, each channel includes a pair of opposed surfaces S which are configured to engage corresponding surfaces forming portions of the periphery of the short leg 10B. For example, each of the channels 24C, 24D, 24E, and 24F may be of a generally V-shape. As will be described in detail later the collet 30 serves to guide the free end of the long leg of the L-shaped Hex Key so that it's central longitudinal axis X is more than parallel to the central longitudinal axis X of the mounting shaft 22, but rather is coincident with it. This is the "desired position" of the L-shaped Hex Key when properly mounted in the adapter 20 so that it can be used with a rotary tool, e.g., an electric drill.

Figure 6A:
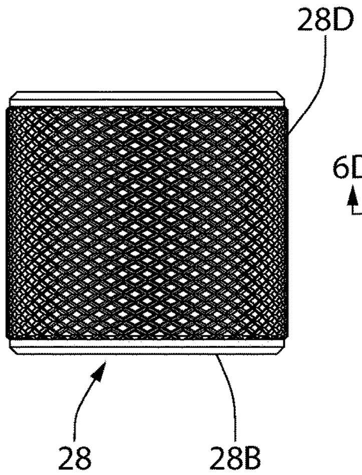
FIG. 6A is a side elevation view of the threaded retaining member of the adapter of FIG. 1.
Figure 6B:
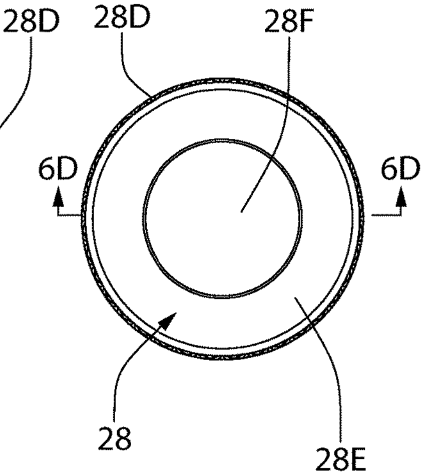
FIG. 6B is a top plan view of the threaded retaining member of FIG. 6A.
Figure 6C:
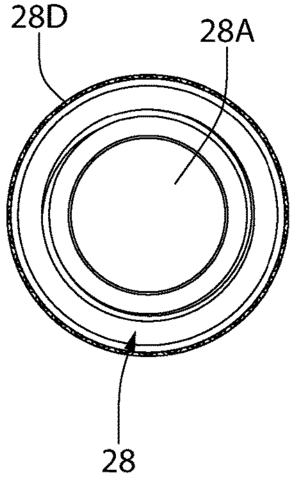
FIG. 6C is a bottom plan view of the threaded retaining member of FIGS. 6A-6B.
Figure 6D:
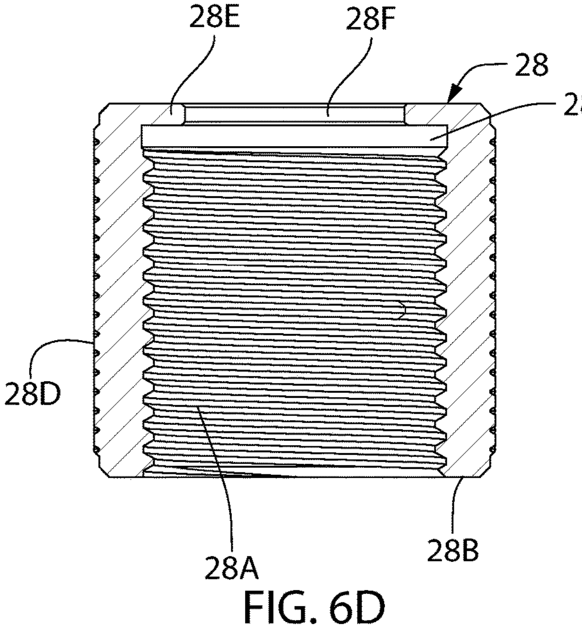
FIG. 6D is a slightly enlarged sectional of the threaded retaining member of FIGS. 6A-6C, taken along line 6D-6D of FIG. 4B.

The retaining member 28 is best seen in FIGS. 3 and 6D and is in the form of a grip nut having an internally threaded passageway 28A (FIGS. 3 and 6D) configured to be threadedly screwed onto the external threads 26B of the center shaft 26. The details of the retaining nut 28 will also be described later. Suffice it for now to state that retaining nut 28 includes a bottom surface 28B which when the L-shaped Allen wrench 10 is in the desired position, and the retaining nut 28 is screwed down onto the center shaft 26 its bottom surface releasably engages a portion of the linear short leg 10B of the L-shaped Hex Key. That action holds the linear short leg 10B of the L-shaped Hex Key in whichever one of one of the V-shaped channels 24C-24F is of the appropriate size for the specific L-shaped Hex Key that is to be held, such that the long leg 10A of that key is in the desired position.

As should be appreciated by those skilled in the art the opposed surfaces S of each of the channel 24C-24F engage corresponding surfaces forming portions of the periphery of the short leg 10B when the short leg is located within the channel. As such, when the retaining nut 28 is tightened so that its bottom surface 28B is in releasable engagement with the short leg 10B of the L-shaped Hex Key to hold the short leg 10B in the channel the second central longitudinal axis Y of the short leg will be centered in the channel and the long leg 10A of L-shaped Hex Key will be in the desired position.

The collet 30 is best seen in FIGS. 3 and 7A-7E and is configured to be coupled to the retaining member to form a unit. The collet is in the form of a generally cylindrical body preferably formed of a resilient material and having a central longitudinal axis X. The cylindrical body includes a plurality, e.g., six, movable jaws 30A encircling the central longitudinal axis X. The jaws are separated from one another by plural equidistantly spaced slots 30E which extend vertically from the top of the collet to a point slightly below the middle of the height of the collet. The plurality of jaws are configured to move, e.g., flex, if necessary from their quiescent or normal position or state like shown in FIGS. 3 and 7A-7E to an operative state like shown in FIGS. 1 and 9. In the quiescent or normal state inner surfaces 30B (to be described later and shown in FIG. 7F) of the upper ends of the jaws conjoin to form a hexagonal passageway 30C between themselves. That passageway is centered on the longitudinal axis X of the mounting shaft 22.

In the operative state the inner surfaces 30B of the jaws engage respective portions of the periphery of the linear long leg 10A of the L-shaped Hex Key to center the linear long leg 10A in the desired position. As will be described later the collet includes six inwardly sloping surfaces 30D which taper and merge with respective inner surfaces of the jaws 30A to guide the free end of the long leg 10A into the passageway 30C so that the central longitudinal axis of the long leg is in the desired position. The details of the collet its jaws, it's sloping surfaces 30D, and other features of the collet and their functions will also be described later.

Figure 5A:
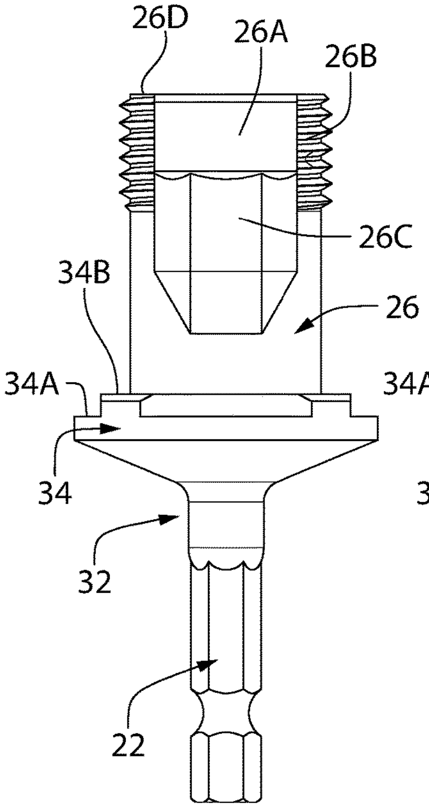
FIG. 5A is a front elevation view of the assembly of the elongated mounting shaft, the flange and the elongated externally threaded shaft.
Figure 5B:
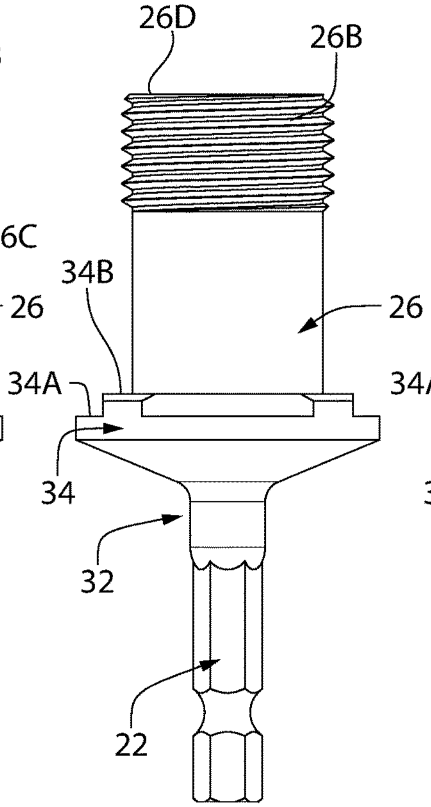
FIG. 5B is a rear elevation view of the assembly shown in FIG. 5A.
Figure 5C:
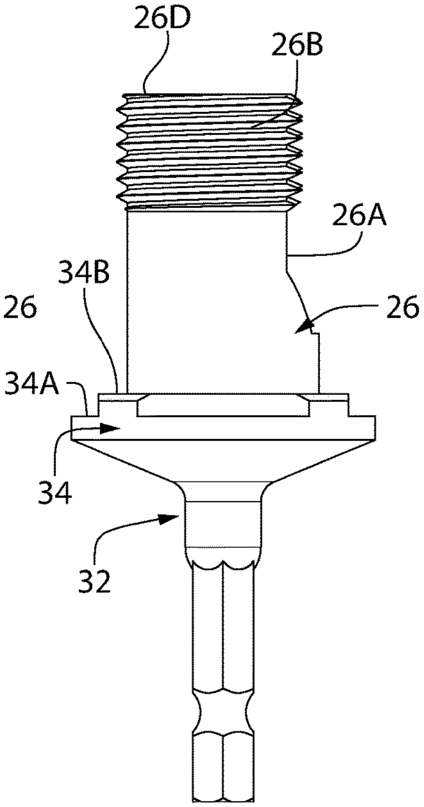
FIG. 5C is a side elevation view of the assembly shown in FIGS. 5A-5B.
Figure 8:
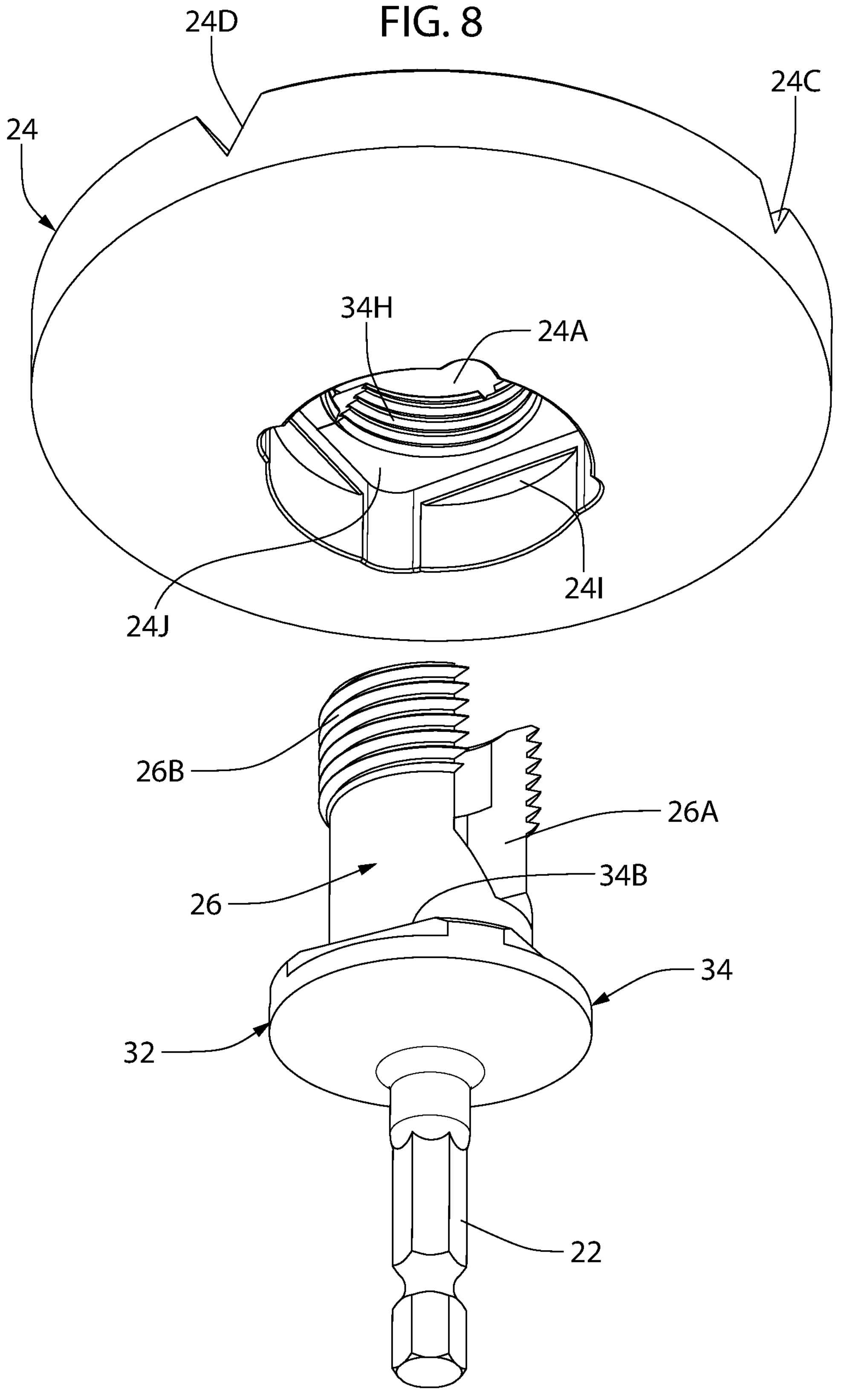
FIG. 8 is an exploded isometric view of the assembly of FIGS. 5A-5C shown juxtaposed with respect to the base plate of FIGS. 4A-4D during the process of assembling those components together.

Turning now to FIGS. 3, 5A and 8 the details of the flange 34 will now be described. In particular, the circular disc making up the flange 34 includes a planar top surface 34A from which a generally square mesa 34B projects upward. The corners of the mesa 34B are rounded and form a portion of the circular periphery of the flange. The top surface of the mesa is planar. The mesa is configured to fit closely within a mating shaped socket in the base plate 24 when the base plate is mounted on the flange, as will be described hereinafter so that so that the base plate from rotating with respect to the flange about the central longitudinal axis X. It should be pointed out at this juncture that the mesa and the mating socket need not be square in shape or even polygonal in shape, but can have any shape that prevents the base plate from rotating with respect to the flange about the central longitudinal axis X.

Turning now to FIGS. 4A-4D and 8, the details of the base plate 24 will now be described. As mentioned earlier the disc-like base plate includes plural V-shaped channels 24C-24F. The cross-section of each V-shaped channel is in the form of an included 60-degree angle. However, each of the channels 24C-24F are of a differing width to accommodate different size L-shaped Hex Keys. For example, the V-shaped channel 24C has a width of 0.5 inch to accommodate L-shaped Hex Keys of a size in the range of 0.39 inch (9.92 mm) to 0.5 inch (12.7 mm). The V-shaped channel 24D has a width of 0.375 inch to accommodate L-shaped Hex Keys of a size in the range of 0.266 inch (6.75 mm) to 0.375 inch (9.53 mm). The V-shaped channel 24E has a width of 0.25 inch to accommodate L-shaped Hex Keys of a size in the range of 0.141 in (3.57 mm) to 0.25 inch (6.35 mm). The V-shaped channel 24F has a width of 0.125 inch to accommodate L-shaped Hex Keys of a size in the range of 0.0625 inch (1.59 mm) to 0.125 inch (3.18 mm). The base plate 24 includes a circular recess 24G in the top surface 24B surrounding the central opening 24A. The inner end of each of the channels 24C-24F merges with the annular recess. The central opening 24A is in the form of a cylindrical upper section 24H (FIGS. 4D and 8) and an enlarged lower section 24I. The upper section 24H of the central opening 24A is internally threaded.

The helical threads of the upper section 24H are configured to engage the external helical threads 26B of the central shaft 26 to mount the base plate onto the flange 34. The lower section 24I of the central opening 24A is in the form of a socket 24J of a corresponding or mating shape to the generally square shaped mesa of the base plate 24, so that the socket receives the mesa 34B of the flange 34 when the base plate is mounted thereon. That action is accomplished by juxtaposing the base plate 24 and the unitary assembly 32 as shown in FIG. 8. Once so juxtaposed, the upper end of the center shaft 26 is inserted through the lower section 24I of the base plate's central opening 24A so that the external threads 26B of the center shaft 26 threadedly engage the internal threads 24H. The base plate 24 and the unitary assembly 32 are then rotated with respect to each other until the threaded end of the center shaft 26 has completely passed through the central opening 24A. Once that has occurred the base plate 24 and the unitary assembly 32 can be manipulated so that the generally square mesa 34B of the flange 34 is disposed within the socket 24I of the base plate. That action completes the mounting of the base plate on the flange, whereupon those assembled components of the adapter 20 are now ready to mount an L-shaped Hex Key thereon and to hold it in place via the retaining nut 28.

Before the action of mounting an L-shaped Hex Key onto the adapter 20 and holding it in place is described the details of construction and function of the retaining nut 28 and the collet 30 is in order. The collet performs the function of properly aligning the long leg 10A of the L-shaped Hex Key with respect to the central longitudinal axis X of the mounting shaft 22 so that it is in the desired position. The retaining nut performs the function of holding the L-shaped Hex Key in that desired position.

As can be seen in FIGS. 1, 3, 6A and 9, the retaining nut is of cylindrical shape and includes a knurled outer surface 28D to facilitate the screwing of the retaining nut onto and off the center shaft 26. If desired the knurled outer surface of the grip nut may be formed of any type of plastic coating or covering, e.g., high density polyethylene. Moreover, if desired the outer surface of the periphery of the retaining nut may be faceted instead of being cylindrical. Further still, the bottom surface 38B of the retaining nut may include a plurality of equidistantly spaced V-shaped notches to facilitate the retaining nut holding the short leg 10B of the L-shaped Hex Key in any one the V-shaped channels 24C-24F. Each notch can support any sized L-shaped Hex Key that fits reasonably within the notch.

Attention is now directed to FIGS. 7A-7E where the details of the construction of the collet 30 are shown. The collet 30 is attached to the top of retaining nut 28. As such when the retaining nut is screwed onto the threaded upper end of the center shaft 26, with the short leg 10B of the L-shaped Hex Key in any one of the channels 24C-24F and with the long leg 10A of that key located within the recess 26A, the collet moves with the retaining nut and guides the long leg 10A to the desired position. The attachment of the collet onto the top of the retaining nut is accomplished by means of an annular peripheral flange 30F (FIG. 7A) at the bottom end of the collet which is received within a correspondingly shaped annular recess 28C (FIG. 6D) in a top portion of the retaining nut 28 beneath an inwardly extending flange 28E at the top of the retaining nut. The inner edge of the inwardly extending flange 28E forms a central opening 28F in which an annular recess 30G (FIG. 7A) of the collet is received.

Figure 7A:
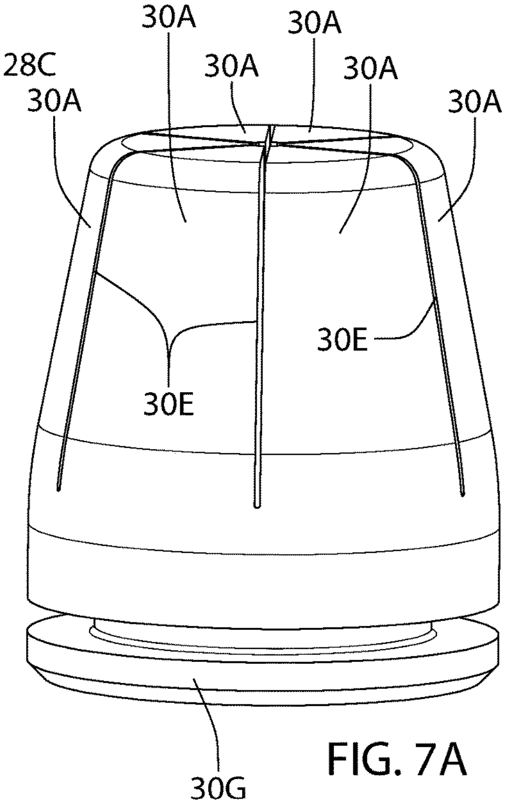
FIG. 7A is a side elevation view of the collet of the adapter of FIG. 1.
Figure 7B:
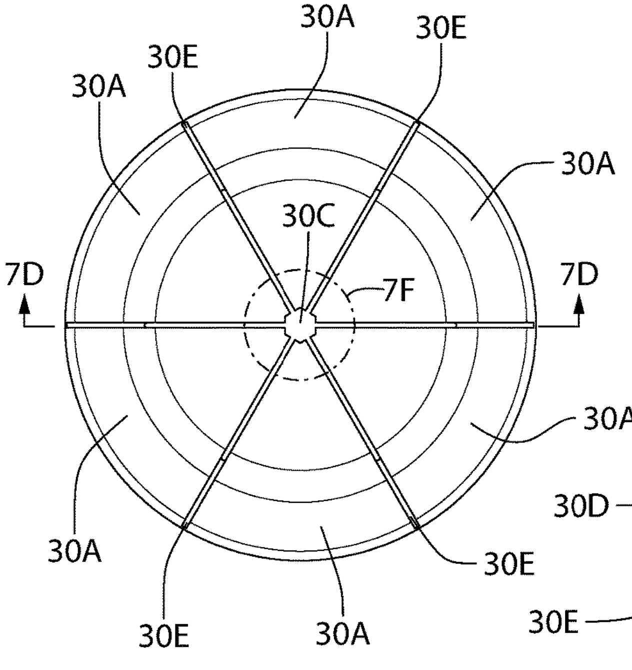
FIG. 7B is a reduced top plan view of the collet of FIG. 7A.
Figure 7C:
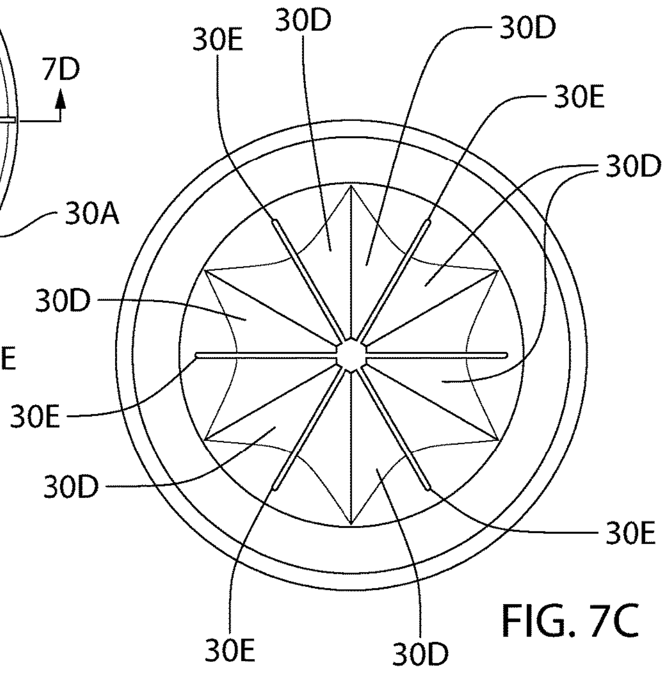
FIG. 7D is an enlarged sectional view taken along line 7D-7D of FIG. 7B.
FIG. 7E is an enlarged, vertically sectioned, isometric view of the collet of FIG. 7A.
FIG. 7F is a greatly enlarged portion of the collet shown within the broken line circle 7F of FIG. 7B.
Figure 7D:
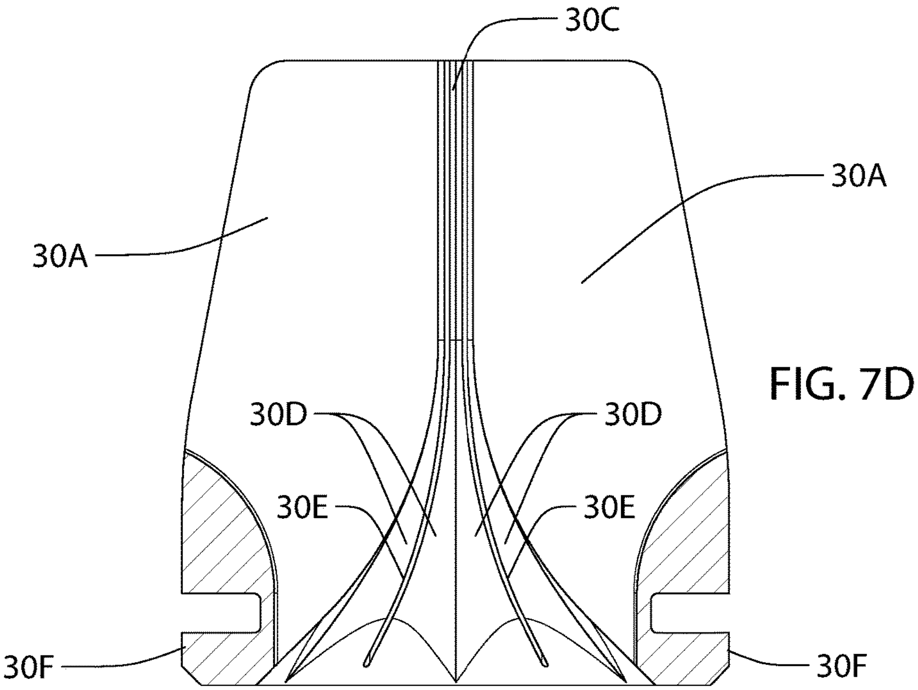
Figure 7E:
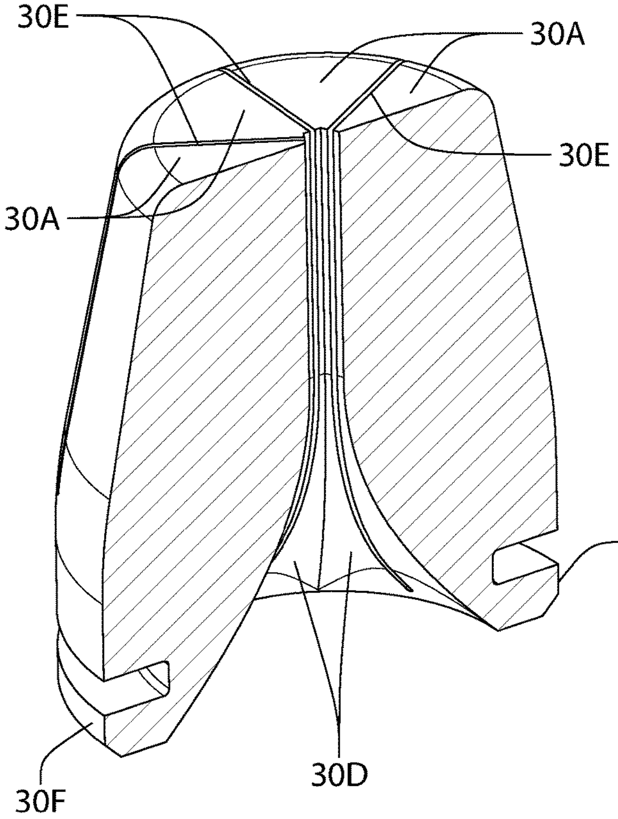
Figure 7F:
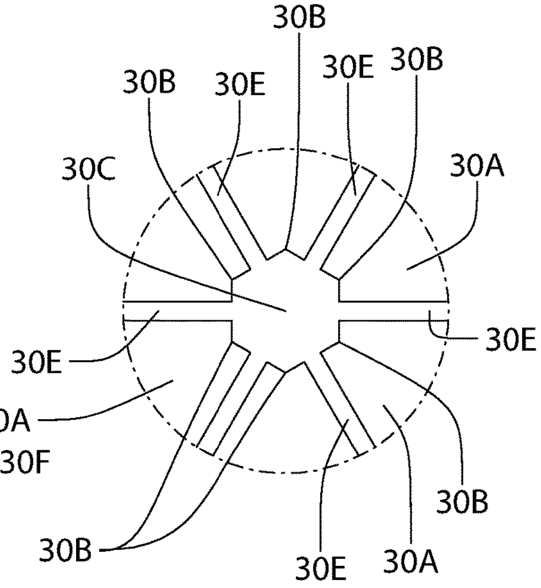

As mentioned earlier the collet is a cylindrical having a body formed of a somewhat resilient material to enable its jaws 30A to move or flex with respect to the central longitudinal axis X so that the upper inner surface 30B of each of the jaws engage respective portions of the periphery of the long leg 10A of the L-shaped Hex Key 10. They do so irrespective of the size, i.e., cross-sectional area, of the key. To that end, as best seen in FIG. 7F, the inner surface of each jaw 30A is in the form of a V-shaped, e.g., 60 degree included angle, notch 30B. Each notch is configured to receive a corner of the periphery of the long leg 10A of any size L-shaped Hex Key when the jaws of the collet are in their operative state.

As also mentioned earlier the collet includes six inwardly sloping surfaces 30D. As best seen in FIGS. 7C-7E each of those surfaces 30D is of an arcuate shape and tapers in width in the direction from the bottom of the collet toward the top of the collet. Moreover, each of the surfaces 30D curves inward in the direction from the bottom of the collet toward the top of the collet, with the portion of the inwardly sloping surfaces 30D from approximate a midpoint in the height of the collet conjoining one another to form the hexagonal passageway 30C. Accordingly, when the long leg 10A of the L-shaped Hex Key is located within the recess 26A of the center shaft 26, and with the short leg 10B of that key located in one of the V-shaped channels 24C-24F, and the retaining nut 28 is screwed onto the threads 26B of the center shaft, the free end 10C of the long leg 10A will engage at least one of the sloping surfaces 30D. Continued screwing of the retaining nut onto the center shaft will cause the free end 10C to slide into the hexagonally shaped passageway If the cross-sectional area of the long leg 10A is the same as the cross-sectional area of the passageway, the V-shaped notches 30B of that passageway will guide the long leg to the desired position without the jaws having to flex. If, however, the cross-sectional area of the long leg 10A is greater than the cross-sectional area of the passageway 30C the jaws will flex radially outward, with the V-shaped notches 30B of the passageway 30C in engagement with respective corners of the cross-section of the long leg 10A to guide the long leg to the desired position as the retaining nut is screwed further downward on the center shaft.

Once the retaining nut 28 has been screwed down to the point that its bottom surface 28B engages a portion of the periphery of the short leg 10B of the L-shaped Hex Key, the short leg will be releasably held in the desired position, with the free end 10C extending out of the top of the collet. Once that has occurred if the adapter 20 is not already mounted in the chuck of the rotary tool, it can be so mounted by extending the bottom end of the mounting shaft 22 into the space between the jaws 12A of the chuck 12. The rotary tool can then be used to rotate the long leg of the L-shape Allen wrench about the rotary axis of the tool to either screw in or screw out a suitably sized hexagonal head threaded fastener.

It should be pointed out at this juncture that in the interest of safety the diameter of the base plate 24 is chosen so that its radius is longer than the length of the short leg 10B of any L-shaped Allen wrench key that may be mounted on the adapter 20. In the exemplary embodiment described above the diameter of the base plate is 2.5 inches. Accordingly, the free end of the short leg 10 of any typical L-shaped Hex Key will not extend beyond the periphery of the base plate. By so doing the base plate provides full coverage of the short leg so that as the L-shaped Hex Key is rotated by the rotary tool, that the free end of the short leg is not exposed to hit a user potentially repeatedly as the L-shaped Hex Key is rotated about the rotary axis of the tool in which the adapter is mounted.

As should be appreciated by those skilled in the art, the removal of the L-shaped Hex Key from the adapter 20 is an easy matter. To that end, all that is required to remove it is to unscrew the retaining nut 28 from the threaded portion of the center shaft 26 until the retaining nut and the collet can be removed from the adapter 20. That action frees the L-shaped Hex Key so that it can be removed from the adapter.

Turning now to FIG. 10 there is shown an alternative embodiment of an adapter 20' constructed in accordance with this invention. As mentioned earlier the adapter 20' is identical in all respects to the adapter 20 except that the mount 22 for mounting the adapter 20' on the rotary tool is different, i.e., it is in the form of a socket for receipt of a conventional or standard driver 14. The components of the adapter 20' which are identical with the components of the adapter 20 will be given the same reference numbers, and the details of their construction, function and operation will not be reiterated in the interest of brevity.

As can be seen best in FIG. 11B the socket 22B is located at the bottom of the flange 34 of the adapter 20' and is centered on central longitudinal axis X of the assembly 32. The socket 22B is of a square shape and is configured to releasably receive the head 14A of the standard driver 14, like shown in FIGS. 10 and 11A. The standard driver also includes a shaft 14B that is configured for receipt in the chuck 12 of the rotary tool. The shaft 14B can be of the quick connect type, like shown in FIGS. 10-11B, or may be merely cylindrical in shape. In any case, the shaft 14B is configured so that it can be readily inserted between the jaws 12A (FIG. 1) of the chuck and gripped by those jaws to mount the adapter 20 on the rotary tool in the same manner that the adapter 20 is mounted in the chuck of the rotary tool. Once so mounted the central longitudinal axis X of the adapter 20' will be coincident with the axis of rotation of the chuck of the rotary tool.

As best seen in FIG. 11B the head 14A of the standard driver 14 includes a detent mechanism in the form of a spring-biased ball 14C. The spring-biased ball 14C is configured to snap-fit into a recess (not shown) in the socket 22B when the head 14A is inserted in the socket. That action ensures that the connection between the adapter 20 and the standard drive 14 is maintained when the adapter is mounted on the rotary tool by standard driver so that the adapter doesn't get accidentally disconnected from the rotary tool.

Turning now to FIGS. 12-17, there is shown another exemplary adapter 20" constructed in accordance with this invention for rotatably mounting an L-shaped Allen wrench key 10 in a standard Jacobs chuck or a quick disconnect chuck of a rotary tool. The adapter 20" is identical in most respects to the adapter 20 except that the mount for holding the L-shaped Allen wrench does not make use of a collet for grasping the long leg 10 of the L-shaped Allen wrench. Rather it uses an alternative structure. In the interest of brevity, the components of the adapter 20" which are identical with the components of the adapter 20 will be given the same reference numbers, and the details of their construction, function and operation will not be reiterated.

As best seen in FIG. 14 the adapter 20" basically comprises the heretofore described mount 22, the base 24, and the center shaft 26. In addition, the adapter also includes an alternative retaining member 38 (to be described in detail shortly) and a centering disc 40. The retaining member 38 is in the form of an upper grip nut 42 and a lower grip nut 44. Each grip nut 42 and 44 is similar in many respects to grip nut 28 but differ in other respects. For example, as best seen in FIG. 16, each grip nut 42 and 44 has an internally threaded passageway 28A configured to be threadedly screwed onto the external threads 26B of the center shaft 26, with the upper grip nut 42 being disposed above the lower grip nut 44. The lower grip nut 44 is shorter in height than the grip nut 28 but otherwise is similar in construction, i.e., it includes a bottom surface 28B configured to engage a portion of the linear short leg 10B of the L-shaped Hex Key when the lower grip nut is screwed down on the threads of the center shaft to the position shown in FIGS. 15 and 16. That action holds the linear short leg 10B of the L-shaped Hex Key in whichever one of one of the V-shaped channels 24C-24F is of the appropriate size for the specific L-shaped Hex Key being held by the adapter 20". The upper grip nut 42 serves a function like that of a lock washer, to hold the lower grip nut in place, so that the L-shaped Allen wrench is held in the desired position like shown in FIGS. 15 and 16. To end the upper grip nut includes a bottom surface 28B which is configured to engage the top surface of the lower grip nut when the lower grip nut is in place in engagement with the short leg 10B of the L-shaped Hex Key.

The centering disc 40 is a generally planar disk-like member of circular profile. The centering disc 40 includes a central opening 40A having a shape corresponding in shape and size to the cross-sectional shape of the long leg of the specific L-shaped Allen wrench key which is to be held and centered by the adapter 20". In accordance with one preferred aspect of this invention the adapter 20" is provided with a kit of plural centering discs, each of which has a different sized central opening. Those discs are shown in FIG. 17. For example, one of the discs includes the heretofore identified central opening 40A which is preferably sized and shaped to accommodate a 0.0625 inch (1.59 mm) to 0.125 inch (3.18 mm) sized Hex Key. Another of those discs includes a central opening 40B which is preferably sized and shaped to accommodate a 0.141 in (3.57 mm) to 0.25 inch (6.35 mm) sized Hex Key. Another of those discs includes a central opening 40C which is preferably sized and shaped to accommodate a 0.266 inch (6.75 mm) to 0.375 inch (9.53 mm) sized Hex Key. Another of those discs includes a central opening 40D which is preferably sized and shaped to accommodate a 0.39 inch (9.92 mm) to 0.5 inch (12.7 mm) sized Hex Key. Each of the discs of the kit has an external diameter that is slightly less than the internal diameter of the annular recess 28C of the upper grip nut 42. Accordingly, each of those centering discs is configured to be disposed on the top surface 26D of the center shaft of the adapter so that the centering disc is located within the annular recess 28C immediately under the inwardly directed flange 28E of the upper grip nut when the upper grip nut is screwed onto the center shaft. That action effectively holds the centering disc in place.

The mount 22 and the center shaft 26 of the adapter 20" are preferably in the form of a unitary member or assembly 32, which also includes the flange 34 constructed like discussed above. The base is in the form of a separate base plate but can be an integral part of the unitary assembly 32. The mount 22 includes elongated linear shaft that is preferably of the quick connect type but can be of circular cross-sectional shape or any other cross-sectional shape to be readily inserted and gripped by the jaws of a chuck of the rotary tool on which the adapter is to be used. As is the case with the adapter 20, the mount 22 of the adapter 20" may be in the form of a socket for receipt of a conventional or standard driver like shown in FIGS. 10-11B.

Use of the adapter 20" is as follows. The user of the adapter 20" will select a particular centering disc 40 from the kit to accommodate the cross-sectional size and shape of the particularly sized L-shaped Hex Key 10 to be used with the rotary tool, e.g., electric drill/driver. The base plate 24 is mounted on the flange 34 of the mount 22. The assembly of the base plate and the mount is now ready to accept the particularly sized L-shaped Hex Key 10 to be used. To that end, the short leg 10B of the selected L-shaped Hex Key 10 is inserted into the appropriately sized one of the V-shaped channels 24C-24F and the L-shaped Hex Key moved to a position so that its long leg 10A is approximately coincident with the central longitudinal axis X.

In accordance with one method of this invention, the lower grip nut 44 can then be screwed onto the external threads 26D of the center shaft until its bottom surface 28B engages a portion of the periphery of the short leg 10B, but not to the point of full or maximum tightness, whereupon the long leg 10A can be moved slightly laterally to center it properly if it is not already properly centered. With the lower grip nut not fully tightened the user can take the selected centering disc 40 to thread it onto the long leg 10A by juxtaposing its particular central opening (40A-40D) with the free end 10C of the long leg, and then sliding the centering disc down the long leg 10B until it engages the top surface 26D of the center shaft 26 so that the centering disc rest upon the top surface of the center shaft. The upper grip nut 42 can then be screwed onto the external threads 26D of the center shaft until the undersurface of its inwardly directed flange 28E engages the top surface of the centering disc 40 contiguous with the periphery of the centering disc. At that time the bottom surface 28B of the upper grip nut engages the top surface of the lower grip nut. If the long leg 10A is appropriately centered coincident with the central longitudinal axis, the lower grip nut can be fully tightened on the short leg, and the upper grip nut fully tightened on the lower grip nut to lock the lower grip nut in place, thus locking the L-shaped Hex Key in place so that it is ready for mounting in the chuck of the rotary tool. If, the long leg 10A of the L-shaped Hex Key is not at the desired centered position before final tightening of the upper and lower grip nuts the long leg 10B can be jiggled or moved laterally slightly with respect to the central longitudinal axis X until it is appropriately centered (coincident with that axis) and then the lower grip nut fully tightened, followed by the fully tightening of the upper grip nut. That action completes the mounting and centering of the L-shaped Hex Key on the adapter 20", whereupon it is ready for mounting and use by an electric drill/driver or some other rotary tool.

In accordance with another method of this invention, before the lower grip 44 nut is screwed onto the center shaft 26, the user can take the selected centering disc 40 to thread it onto the long leg 10A by juxtaposing its particular central opening (40A-40D) with the free end 10C of the long leg, and then sliding the centering disc down the long leg 10B until it engages the top surface 26D of the center shaft 26. The lower grip nut 44 can then be screwed onto the external threads 26D of the center shaft until its bottom surface 28B engages a portion of the periphery of the short leg 10B but not to the point of full or maximum tightness, whereupon the long leg 10A can be moved slightly laterally to center it properly if it is not already properly centered. With the lower grip nut not fully tightened upper grip nut 42 can then be screwed onto the external threads 26D of the center shaft until the undersurface of its inwardly directed flange 28E engages the top surface of the centering disc 40 contiguous with the periphery of the centering disc. At that time the bottom surface 28B of the upper grip nut engages the top surface of the lower grip nut. If the long leg 10A is appropriately centered coincident with the central longitudinal axis, the lower grip nut can be fully tightened on the short leg, and the upper grip nut fully tightened on the lower grip nut to lock the lower grip nut in place, thus locking the L-shaped Hex Key in place so that it is ready for mounting in the chuck of the rotary tool. If, the long leg of the L-shaped Hex Key is not at the desired centered position before final tightening of the upper and lower grip nuts the long leg 10B can be jiggled or moved laterally slightly with respect to the central longitudinal axis X until it is appropriately centered (coincident with that axis) and then the lower grip nut fully tightened, followed by the fully tightening of the upper grip nut. That action completes the mounting and centering of the L-shaped Hex Key on the adapter 20", whereupon it is ready for mounting and use by an electric drill/driver or some other rotary tool.

It must be pointed out at this juncture that various other changes can be made to the adapters of this invention. Thus, the three exemplary embodiments as described above must be understood to be merely three of many various adapters that can be constructed in accordance with this invention. For example, the adapter of this invention may be provided with means to enhance the proper positioning of the long leg 10A of an L-shaped Hex Key in the desired position wherein the central longitudinal axis X of that long leg is coincident with the central longitudinal axis X of the mounting shaft. That means, which will be described hereinafter, may be used in conjunction with the collet 30 or in lieu of the collet. In any case that means may be in the form of a kit of plural centering inserts. Each centering insert comprises a body whose shape and size are configured for receipt within the socket 26C in the recess 26A of the center shaft 26. Each centering insert includes a front face including a 60-degree V-shaped channel facing toward the central longitudinal axis X of the recess 26A of the center shaft 26. Each V-shaped recess is designed for engaging a portion of the periphery of the long leg 10A so that the central longitudinal axis of the long leg will be coincident with the central longitudinal axis of the mounting shaft. For example, three such inserts may be provided to accommodate L-shaped Hex Keys of three different cross-sectional size ranges. The first insert's V-shaped channel will accommodate L-shaped Hex Keys having a cross-sectional size of 0.0625-0.125 inch. The second insert's V-shaped channel will accommodate L-shaped Hex Keys having a cross-sectional size of 0.1875-0.25 inch. The third insert's V-shaped channel will accommodate L-shaped Hex Keys having a cross-sectional size of 0.3125-0.375 inch. Furthermore, adapters constructed in accordance with this invention can be used with any type of rotary tool which includes a chuck that is rotatable about a rotation axis, irrespective of the construction of the chuck and irrespective of the type of rotary tool.

Without further elaboration the foregoing will so fully illustrate our invention that others may, by applying current or future knowledge, adopt the same for use under various conditions of service.

We claim:

1. An adapter for releasably mounting various sizes of L-shaped Allen wrench keys in a chuck of a rotary tool, the chuck being rotatable about a rotary axis, each of the various sizes of the L-shaped Allen wrench keys comprising a linear long leg having a first central longitudinal axis and a linear short leg having a second central longitudinal axis extending perpendicular to the first central longitudinal axis, said adapter comprising:

a mount having a central longitudinal axis, said mount being configured for releasable coupling to the chuck of the rotary tool, whereupon said central longitudinal axis of said mount is coincident with the rotary axis;

said adapter including a collet and a base including a portion extending radially outward from said central longitudinal axis, said collet having a plurality of more than two movable jaws, all of said more than two movable jaws being of a similar shape and including an inner surface, all of said more than two movable jaws being configured to be conjoined to locate and accommodate any one of the various sizes of the L-shaped Allen wrench keys in a hexagonal passageway located between all of said more than two movable jaws, said hexagonal passageway being formed by the conjoining of said inner surfaces of all of said more than two movable jaws, and a center structure coupled to said collet and said mount and configured for releasably mounting any one of said various sizes of the L-shaped Allen wrench keys on said adapter, wherein said first longitudinal axis of the linear long leg of any one of the various sizes of the L-shaped Allen wrench keys that is located in said hexagonal passageway is coincident with said rotary axis irrespective of the size of the L-shaped Allen wrench key that is located in said hexagonal passageway and with a portion of the linear short leg of the any one of the various sizes of L-shaped Allen wrench keys that is located in said hexagonal passageway being in engagement with said portion of said base extending radially outward from said central longitudinal axis.

2. An adapter for releasably mounting an L-shaped Allen wrench key in a chuck of a rotary tool, the chuck being rotatable about a rotary axis, the L-shaped Allen wrench key comprising a linear long leg having a first central longitudinal axis and a linear short leg having a second central longitudinal axis extending perpendicular to the first central longitudinal axis, said adapter comprising:

a mount having a central longitudinal axis, said mount being configured for releasable coupling to the chuck of the rotary tool, whereupon said central longitudinal axis of said mount is coincident with the rotary axis;

said adapter including a center structure coupled to said mount and configured for releasably mounting the L-shaped Allen wrench key on said adapter, wherein said first longitudinal axis of the linear long leg of the L-shaped Allen wrench key is coincident with said rotary axis, wherein said center structure comprises an elongated center shaft including a threaded outer surface and a longitudinal channel in said threaded outer surface, said longitudinal channel having a central longitudinal axis coincident with said central longitudinal axis of said mount and configured for receipt of the linear long leg of the L-shaped Allen wrench key, and wherein said adapter additionally comprises:

a base from which said elongated center shaft projects upward, said base having at least one channel extending radially from said central longitudinal axis of said mount and configured for receipt of the linear short leg of the L-shaped Allen wrench key therein, each said at least one channel includes a pair of opposed surfaces which are configured to engage corresponding surfaces forming portions of the periphery of the linear short leg of the L-shaped Allen wrench key;

a threaded member configured to be threadedly secured on said threaded outer surface of said elongated center shaft to releasably engage a portion of the linear short leg of the Allen wrench keys to hold the linear short leg of the L-shaped Allen wrench key in said at least one channel and with the first central longitudinal axis of the linear long leg of the L-shaped Allen wrench key being axially aligned with the rotary axis.

3. The adapter of claim 2, wherein said at least one channel is generally V-shaped.

4. The adapter of claim 2, wherein said adapter additionally comprises a collet coupled to said threaded member comprising a plurality of movable jaws encircling said central longitudinal axis of said elongated center shaft, said plurality of jaws being configured to move to engage respective portions of a periphery of the linear long leg of the L-shaped Allen wrench to hold the first central longitudinal axis of the linear long leg of the L-shaped Allen wrench key coincident with the rotary axis.

5. The adapter of claim 4, wherein said collet includes a bottom end and a top end, said bottom end being secured to a top end of said threaded member, wherein each of said jaws of said plurality of movable jaws is resilient, and wherein said collet includes a plurality of tapering inner surfaces located contiguous and below said plurality of movable jaws, each of said tapering inner surfaces tapering inward radially towards said central longitudinal axis of said elongated center shaft from said bottom end of said collet toward said top end of said collet.

6. The adapter of claim 2, wherein said adapter is configured to releasably mount different size L-shaped Allen wrench keys thereon and wherein said base comprises plural channels extending radially from said central longitudinal axis of said elongated center shaft, each of said channels being configured to receive a linear short leg of a different size L-shaped Allen wrench key.

7. The adapter of claim 2, wherein said threaded member comprises an internally threaded nut having a bottom edge surface configured for releasable engagement with a portion of the linear short leg of the L-shaped Allen wrench key.

8. The adapter of claim 2, wherein said long leg has a cross-sectional shape, and wherein said adapter additionally comprises an insert configured for mounting on said elongated center shaft, said insert having a central opening having a shape corresponding to a cross-sectional shape of the long leg of the L-shaped Allen wrench key.

9. The adapter of claim 8, wherein said elongated center shaft has an upper surface, wherein said insert comprises a disc configured for releasably disposition on said upper surface, said disc including a central opening having a shape corresponding to a cross-sectional shape of the long leg of the L-shaped Allen wrench key, and wherein said threaded member is configured to releasably engage a portion of said disc to hold said disc on said upper surface of said elongated center shaft.

10. The adapter of claim 9, wherein said threaded member comprises a first threaded member and a second threaded member, each of which is configured to be threadedly secured on said threaded outer surface of said elongated center shaft, with said first threaded member being disposed above said second threaded member, said second threaded member being configured to releasably engage a portion of the linear short leg of the Allen wrench key, said first threaded member being configured to releasably engage a portion of said disc to hold said disc on said upper surface of said elongated center shaft and to releasably lock said second threaded member in place in engagement with a portion of the linear short leg of the L-shaped Allen wrench key.

11. The adapter of claim 9, wherein said adapter is configured to releasably mount different size L-shaped Allen wrench keys thereon, wherein said base comprises plural channels extending radially from said central longitudinal axis of said elongated center shaft, each of said channels being configured to receive a linear short leg of a different size L-shaped Allen wrench key, and wherein said disc comprises one of a plurality of discs, each of said plurality of discs having a shape corresponding to a cross-sectional shape of the long leg of the different size L-shaped Allen wrench key.

12. The adapter of claim 2, wherein said adapter includes a flange interposed between said mount and said elongated center shaft, and wherein said base comprises a base plate configured for mounting on said flange.

13. The adapter of claim 12, wherein said flange includes a planar top surface and a mesa projecting upward from said planar top surface, and wherein said base plate includes a socket configured for receipt of said mesa so that said base plate is prevented from rotating with respect to said flange about said central longitudinal axis.

14. The adapter of claim 2, wherein said mount is an elongated quick connect shaft configured for releasable mounting within the chuck of the rotary tool.

15. The adapter of claim 2, wherein said mount comprises a socket for receipt of a standard driver configured for releasable mounting within the chuck of the rotary tool.

16. An adapter for releasably mounting various sizes of L-shaped Allen wrench keys in a chuck of a rotary tool, the chuck being rotatable about a rotary axis, each of the various sizes of the L-shaped Allen wrench keys comprising a linear long leg having a first central longitudinal axis and a linear short leg having a second central longitudinal axis extending perpendicular to the first central longitudinal axis, said adapter comprising:

a mount having a central longitudinal axis, said mount being configured for releasable coupling to the chuck of the rotary tool, whereupon said central longitudinal axis of said mount is coincident with the rotary axis;

said adapter including a collet having a plurality of movable jaws configured to locate and accommodate any one of the various sizes of the L-shaped Allen wrench keys in a passageway located between said movable jaws, and a center structure coupled to said collet and said mount and configured for releasably mounting any one of said various sizes of the L-shaped Allen wrench keys on said adapter, wherein said first longitudinal axis of the linear long leg of any one of the various sizes of the L-shaped Allen wrench keys that is located in said passageway is coincident with said rotary axis irrespective of the size of the L-shaped Allen wrench key that is located in said passageway, wherein said adapter additionally comprises a base from which an elongated center shaft projects upward, said base having at least one channel extending radially from said central longitudinal axis of said mount and configured for receipt of the linear short leg of any one of the various sizes of the L-shaped Allen wrench keys therein, each said at least one channel includes a pair of opposed surfaces which are configured to engage corresponding surfaces forming portions of the periphery of the linear short leg of any one of the various sizes of the L-shaped Allen wrench keys.

17. A method of using any one of various sized L-shaped Allen wrench keys in a rotary power tool having a chuck, the chuck being rotatable about a rotary axis, each of said various sizes of said L-shaped Allen wrench keys comprising a linear long leg having a first central longitudinal axis and a linear short leg having a second central longitudinal axis extending perpendicularly to said first central longitudinal axis, said method comprising:

providing an adapter comprising a mount having a central longitudinal axis, said adapter comprising a collet and a base, said collet having a plurality of more than two movable jaws, all of said more than two movable jaws being of a similar shape and including an inner surface, all of said more than two movable jaws being configured to be conjoined to locate and accommodate any one of the various sizes of the L-shaped Allen wrench keys in a hexagonal passageway located between all of said more than two movable jaws, said hexagonal passageway being formed by the conjoining of said inner surfaces of all of said more than two movable jaws, and a center structure coupled to said collet and said mount and configured for releasably mounting any one of said various sizes of the L-shaped Allen wrench keys on said adapter, wherein said first longitudinal axis of the linear long leg of any one of the various sizes of the L-shaped Allen wrench keys that is located in said passageway is coincident with said rotary axis irrespective of the size of the L-shaped Allen wrench key that is located in said passageway;

releasably coupling said mount to the chuck of the rotary tool, whereupon said central longitudinal axis of said mount is coincident with said rotary axis;

releasably mounting any one of said various sizes of said L-shaped Allen wrench keys on said adapter, wherein said first central longitudinal axis of said linear long leg of any one of said various sizes of said L-shaped Allen wrench keys is located in said passageway and is coincident with said rotary axis and with a portion of said linear short leg of said any one of said various sizes of L-shaped Allen wrench keys that is located in said passageway being in engagement with said base; and operating said rotary power tool to cause said linear short leg of any one of said various sizes of said L-shaped Allen wrench keys to rotate about said first central longitudinal axis.

18. A method of using any one of various sized L-shaped Allen wrench keys in a rotary power tool having a chuck, the chuck being rotatable about a rotary axis, each of said various sizes of said L-shaped Allen wrench keys comprising a linear long leg having a first central longitudinal axis and a linear short leg having a second central longitudinal axis extending perpendicularly to said first central longitudinal axis, said method comprising:

providing an adapter comprising a mount having a central longitudinal axis, said adapter comprising a collet having a plurality of movable jaws configured to locate and accommodate any one of the various sizes of the L-shaped Allen wrench keys in a passageway located between said movable jaws, and a center structure coupled to said collet and said mount and configured for releasably mounting any one of said various sizes of the L-shaped Allen wrench keys on said adapter, wherein said first longitudinal axis of the linear long leg of any one of the various sizes of the L-shaped Allen wrench keys that is located in said passageway is coincident with said rotary axis irrespective of the size of the L-shaped Allen wrench key that is located in said passageway, and wherein said adapter comprises a base coupled to said mount and having at least one V-shaped channel extending radially from said central longitudinal axis of said mount, said V-shaped channel receiving said linear short leg of any one of said various sizes of said L-shaped Allen wrench keys therein;

releasably coupling said mount to the chuck of the rotary tool, whereupon said central longitudinal axis of said mount is coincident with said rotary axis;

releasably mounting any one of said various sizes of said L-shaped Allen wrench keys on said adapter, wherein said first central longitudinal axis of said linear long leg of any one of said various sizes of said L-shaped Allen wrench keys is coincident with said rotary axis; and operating said rotary power tool to cause said linear short leg of any one of said various sizes of said L-shaped Allen wrench keys to rotate about said first central longitudinal axis.

19. The method of claim 18, wherein said adapter additionally comprises an elongated center shaft projecting upward from said base, said elongated center shaft including a threaded outer surface and a longitudinal channel in said threaded outer surface, said longitudinal channel having a central longitudinal axis extending parallel to said central longitudinal axis of said mount, said linear long leg of any one of said various sizes of said L-shaped Allen wrench keys being disposed within said central longitudinal channel with said first central longitudinal axis of said linear long leg of any one of said various sizes of said L-shaped Allen wrench keys being coincident with said rotary axis.

20. The method of claim 19, wherein said adapter additionally comprises a threaded member threadedly secured on said threaded outer surface of said elongated center shaft to releasably engage a portion of said linear short leg of any one of said various sizes of said L-shaped Allen wrench keys to hold said linear short leg of any one of said various sizes of said L-shaped Allen wrench keys in said at least one V-shaped channel and with said first central longitudinal axis of said linear long leg of any one of said various sizes of said L-shaped Allen Wrench keys coincident with said rotary axis.

* * * * *